US012159586B2

(12) United States Patent
Song et al.

(10) Patent No.: US 12,159,586 B2
(45) **Date of Patent: *Dec. 3, 2024**

(54) DISPLAY DEVICE, DRIVING CIRCUIT AND DISPLAY DRIVING METHOD

(71) Applicant: LG Display Co., Ltd., Seoul (KR)

(72) Inventors: Won-Seok Song, Paju-si (KR); Bonghwan Kim, Ulsan (KR); Sunhwan Kim, Seoul (KR); Mirae Shin, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,093

(22) Filed: Sep. 6, 2023

(65) Prior Publication Data

US 2023/0410748 A1 Dec. 21, 2023

Related U.S. Application Data

(63) Continuation of application No. 17/948,955, filed on Sep. 20, 2022, now Pat. No. 11,783,774.

(30) Foreign Application Priority Data

Nov. 8, 2021 (KR) ........................ 10-2021-0152339

(51) Int. Cl.
*G09G 3/3233* (2016.01)
*G09G 3/20* (2006.01)
*G09G 3/3291* (2016.01)

(52) U.S. Cl.
CPC ......... *G09G 3/3233* (2013.01); *G09G 3/2096* (2013.01); *G09G 3/3291* (2013.01); *G09G 2300/0819* (2013.01); *G09G 2300/0842* (2013.01); *G09G 2300/0861* (2013.01); *G09G 2310/0297* (2013.01); *G09G 2310/08* (2013.01); *G09G 2320/0233* (2013.01);
(Continued)

(58) Field of Classification Search
None
See application file for complete search history.

(56) References Cited

U.S. PATENT DOCUMENTS 11,735,123 B2 * 8/2023 Kim .................... H01L 23/5226 345/204
11,783,774 B2 * 10/2023 Song .................... G09G 3/3233 345/691

(Continued)

*Primary Examiner* — Dorothy Harris
(74) *Attorney, Agent, or Firm* — Fenwick & West LLP

(57) ABSTRACT

A display device comprises: a display panel including a light emitting element, a driving transistor providing a driving current to the light emitting element using a high potential driving voltage and switching transistors controlling the driving transistor; a gate driving circuit supplying scan signals to the display panel; a data driving circuit generating a data voltage or a bias voltage using a feedback high potential driving voltage transmitted through a high potential driving voltage feedback line; and a timing controller controlling the gate driving circuit and the data driving circuit so that the data voltage is supplied to the display panel in a first period at a low speed mode which the display panel is driven at predetermined driving frequency less than a frequency of a high speed mode and the bias voltage is supplied to the display panel in a second period at a low speed mode.

13 Claims, 16 Drawing Sheets

(52) U.S. Cl.
CPC ............... *G09G 2320/0247* (2013.01); *G09G 2330/021* (2013.01); *G09G 2330/028* (2013.01)

(56) References Cited

U.S. PATENT DOCUMENTS

| | | | | |
|---|---|---|---|---|
| 11,830,443 | B2 * | 11/2023 | Kim | G09G 3/3291 |
| 11,935,475 | B2 * | 3/2024 | Noh | G09G 3/3233 |
| 2008/0266276 | A1 * | 10/2008 | Choi | G09G 3/3685 345/204 |
| 2016/0049113 | A1 * | 2/2016 | Park | G09G 3/3208 345/212 |
| 2020/0111418 | A1 * | 4/2020 | Nam | G09G 3/3233 |
| 2020/0226978 | A1 * | 7/2020 | Lin | H01L 29/7869 |
| 2022/0215803 | A1 * | 7/2022 | Pyun | G09G 3/20 |
| 2022/0277705 | A1 * | 9/2022 | Higuchi | G09G 3/3696 |
| 2023/0154408 | A1 * | 5/2023 | Han | G09G 3/3258 345/690 |

* cited by examiner

DISPLAY DEVICE, DRIVING CIRCUIT AND DISPLAY DRIVING METHOD

CROSS-REFERENCE TO RELATED APPLICATION

This application is a continuation of U.S. patent application Ser. No. 17/948,955 filed on Sep. 20, 2022, which claims the priority benefit of Republic of Korea Patent Application No. 10-2021-0152339, filed on Nov. 8, 2021 in the Korean Intellectual Property Office, each of which is hereby incorporated by reference in its entirety.

BACKGROUND

1. Technical Field

The present disclosure relates to display device, driving circuit and display driving method capable of capable of reducing defects of image quality appearing on a display panel in a process of changing a driving frequency.

2. Discussion of the Related Art

With the development of the information society, there has been an increasing demand for a variety of types of image display devices. In this regard, a range of display devices, such as liquid crystal display device, and organic light emitting display device, have recently come into widespread use.

Among such display devices, the organic light emitting display devices have superior properties, such as rapid response speeds, high contrast ratios, high emissive efficiency, high luminance, and wide viewing angles, since self-emissive organic light emitting diodes are used as a light emitting element.

Such an organic light emitting display device may include organic light emitting diodes disposed in a plurality of subpixels aligned in a display panel, and may control the organic light emitting diodes to emit light by controlling a voltage flowing through the light emitting diodes, so as to display an image while controlling luminance of the subpixels.

In this case, the image data supplied to the display device may be a still image or a moving image variable at a constant speed, and even in the case of a moving image, it may be various types of images such as sports images, movies, or game images.

In addition, the display device may be switched to various operation modes according to a user's input or operation state.

On the other hand, the display device may change the driving frequency according to the type of input image data or operation mode. In the process of operating at a low driving frequency, image distortion or quality degradation such as flicker may be occurred.

SUMMARY

Accordingly, a display device, a driving circuit and a display driving method capable of reducing defects of image quality occurring in the process of operating at a low driving frequency are described herein.

Embodiments of the present disclosure provide a display device, a driving circuit and a display driving method capable of reducing defects of image quality such as flicker generated due to a pattern of image data in a period which is operated at a low driving frequency.

Embodiments of the present disclosure provide a display device, a driving circuit and a display driving method capable of reducing defects of image quality such as flicker by determining a bias voltage depending on a change in a driving voltage due to a pattern of image data in a period which is operated at a low driving frequency.

The problems to be solved according to the embodiments of the present disclosure described below are not limited to the problems mentioned above, and other problems that are not mentioned will be clearly understood by those skilled in the art from the following description.

A display device according to an embodiment of the present disclosure includes a display panel including a light emitting element, a driving transistor for providing a driving current to the light emitting element using a high potential driving voltage and a plurality of switching transistors for controlling the operation of the driving transistor; a gate driving circuit for supplying a plurality of scan signals to the display panel; a data driving circuit for generating a data voltage or a bias voltage using a feedback high potential driving voltage transmitted through a high potential driving voltage feedback line; and a timing controller for controlling the gate driving circuit and the data driving circuit so that the data voltage is supplied to the display panel in a first period at a low speed mode and the bias voltage is supplied to the display panel in a second period at the low speed mode which the display panel is driven at the low speed driving frequency, wherein the low speed mode is driven at predetermined driving frequency lower than a high speed mode.

In the display device according to an embodiment of the present disclosure, the plurality of switching transistors include a first switching transistor to which a first scan signal is supplied to a gate electrode, a drain electrode is connected to a gate electrode of the driving transistor, and a source electrode is connected to a source electrode of the driving transistor; a second switching transistor to which a second scan signal is supplied to a gate electrode, the data voltage or the bias voltage is supplied to a drain electrode, and a source electrode is connected to a drain electrode of the driving transistor; a third switching transistor to which a light emitting signal is supplied to a gate electrode, a high potential driving voltage is supplied to a drain electrode, and a source electrode is connected to the drain electrode of the driving transistor; a fourth switching transistor to which the light emitting signal is supplied to a gate electrode, a drain electrode is connected to the source electrode of the driving transistor, and a source electrode is connected to an anode electrode of the light emitting element; a fifth switching transistor to which a third scan signal is supplied to a gate electrode, a stabilization voltage is supplied to a drain electrode, and a source electrode is connected to the gate electrode of the driving transistor and a storage capacitor; and a sixth switching transistor to which a fourth scan signal is supplied to a gate electrode, a reset voltage is supplied to a drain electrode, and a source electrode is connected to the anode electrode of the light emitting element.

In the display device according to an embodiment of the present disclosure, the plurality of switching transistors include a first switching transistor to which a first scan signal is supplied to a gate electrode, a drain electrode is connected to a gate electrode of the driving transistor, and a source electrode is connected to a source electrode of the driving transistor; a second switching transistor to which a second scan signal is supplied to a gate electrode, the data voltage is supplied to a drain electrode, and a source electrode is connected to a drain electrode of the driving transistor; a third switching transistor to which a light emitting signal is supplied to a gate electrode, a high potential driving voltage is supplied to a drain electrode, and a source electrode is connected to the drain electrode of the driving transistor; a fourth switching transistor to which the light emitting signal is supplied to a gate electrode, a drain electrode is connected to the source electrode of the driving transistor, and a source electrode is connected to an anode electrode of the light emitting element; a fifth switching transistor to which a third scan signal is supplied to a gate electrode, a stabilization voltage is supplied to a drain electrode, and a source electrode is connected to the gate electrode of the driving transistor and a storage capacitor; a sixth switching transistor to which a fourth scan signal is supplied to a gate electrode, a reset voltage is supplied to a drain electrode, and a source electrode is connected to the anode electrode of the light emitting element; and a seventh switching transistor to which a fifth scan signal is supplied to a gate electrode, the bias voltage is supplied to a drain electrode, and a source electrode is connected to the drain electrode of the driving transistor.

In the display device according to an embodiment of the present disclosure, the high potential driving voltage feedback line is extended from an end of a driving voltage line arranged outside the display panel and electrically connected to the data driving circuit.

In the display device according to an embodiment of the present disclosure, the data driving circuit includes a gamma voltage generating circuit for generating a reference gamma voltage by using the feedback high potential driving voltage as a reference voltage; a bias voltage generating circuit for generating the bias voltage by using the feedback high potential driving voltage as a reference voltage; a plurality of resistor strings for generating the data voltage by dividing the reference gamma voltage; and a multiplexer for transmitting the data voltage or the bias voltage to the display panel in response to a selection signal.

In the display device according to an embodiment of the present disclosure, the gamma voltage generating circuit includes a first reference gamma voltage output circuit for generating a first reference gamma voltage with a low gray level by using the feedback high potential driving voltage as a reference voltage; and a second reference gamma voltage output circuit for generating a second reference gamma voltage with a high gray level by using the feedback high potential driving voltage as a reference voltage.

In the display device according to an embodiment of the present disclosure, the first reference gamma voltage output circuit, the second reference gamma voltage output circuit, and the bias voltage generating circuit are low drop output circuits for converting the feedback high potential driving voltage into a specific output voltage.

In the display device according to an embodiment of the present disclosure, the first period is a refresh frame period to which the data voltage for driving the light emitting element is supplied.

In the display device according to an embodiment of the present disclosure, the second period is a skip frame period to which the data voltage is not supplied and the bias voltage is supplied.

In the display device according to an embodiment of the present disclosure, the data voltage and the bias voltage are changed with the same variation.

A driving circuit according to an embodiment of the present disclosure includes a gamma voltage generating circuit for generating a reference gamma voltage by using a feedback high potential driving voltage as a reference voltage; a bias voltage generating circuit for generating a bias voltage by using the feedback high potential driving voltage as a reference voltage; a plurality of resistor strings for generating a data voltage by dividing the reference gamma voltage; and a multiplexer for transmitting the data voltage or the bias voltage to a display panel in response to a selection signal A display driving method according to an embodiment of the present disclosure for driving a display panel including a light emitting element, a driving transistor for providing a driving current to the light emitting element using a high potential driving voltage, and a plurality of switching transistors for controlling an operation of the driving transistor, includes receiving a feedback high potential driving voltage through a high potential driving voltage feedback line; generating a reference gamma voltage by using the feedback high potential driving voltage; generating a bias voltage by using the feedback high potential driving voltage; supplying a data voltage by using the reference gamma voltage in a first period of a low speed mode which the display panel is driven at predetermined driving frequency lower than a high speed mode; and supplying the bias voltage in a second period of the low speed mode.

According to embodiments of the present disclosure, it is possible to provide a display device, a driving circuit and a display driving method capable of reducing defects of image quality occurring in the process of operating at a low driving frequency.

In addition, according to embodiments of the present disclosure, it is possible to provide a display device, a driving circuit and a display driving method capable of reducing defects of image quality such as flicker generated due to a pattern of image data in a period which is operated at a low driving frequency.

In addition, according to embodiments of the present disclosure, it is possible to provide a display device, a driving circuit and a display driving method capable of reducing defects of image quality such as flicker by determining a bias voltage depending on a change in a driving voltage due to a pattern of image data in a period which is operated at a low driving frequency.

The effects of the embodiments disclosed in the present disclosure are not limited to the above mentioned effects. In addition, the embodiments disclosed in the present disclosure may cause another effect not mentioned above, which will be clearly understood by those skilled in the art from the following description.

DETAILED DESCRIPTION

Figure 1:
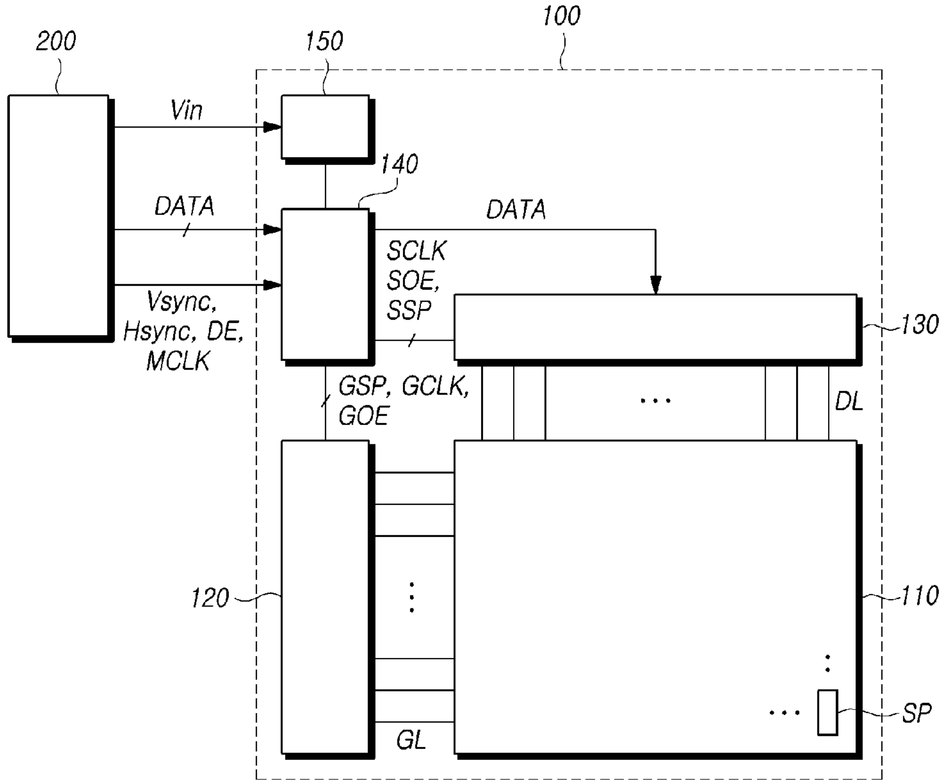
FIG. 1 illustrates a schematic diagram of a display device according to embodiments of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field. The scope of the present disclosure shall be defined by the appended claims.

The shapes, sizes, ratios, angles, numbers, and the like, inscribed in the drawings to illustrate exemplary embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise", "include", "have", and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as "on", "above", "under", "below", and "on a side of", are used herein for descriptions of relationships between one element or component and another element or component, one or more intervening elements or components may be present between the one and other elements or components, unless a term, such as "directly", is used.

When temporally relative terms, such as "after", "subsequent", "following", and "before" are used to define a temporal relationship, a non-continuous case may be included unless the term "immediately" or "directly" is used.

In descriptions of signal transmission, such as "a signal is sent from node A to node B", a signal may be sent from node A to node B via another node unless the term "immediately" or "directly" is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of exemplary embodiments of the present disclosure may be partially or entirely coupled or combined with each other and may work in concert with each other or may operate in a variety of technical methods. In addition, respective exemplary embodiments may be carried out independently or may be associated with and carried out in concert with other embodiments.

Hereinafter, a variety of embodiments will be described in detail with reference to the accompanying drawings".

FIG. 1 illustrates a schematic diagram of a display device according to embodiments of the present disclosure.

Referring to FIG. 1, the display device 100 according to embodiments of the present disclosure may include a display panel 110 connected to a plurality of gate lines GL and a plurality of data lines DL in which a plurality of subpixels SP are arranged in rows and columns, a gate driving circuit 120 for supplying scan signals to the plurality of gate lines GL and a data driving circuit 130 for supplying data voltages to the plurality of data lines DL, a timing controller 140 for controlling the gate driving circuit 120 and the data driving circuit 130, and a power management circuit 150.

The display panel 110 displays an image based on the scan signals supplied from the gate driving circuit 120 through the plurality of gate lines GL and the data voltages supplied from the data driving circuit 130 through the plurality of data lines DL.

In the case of a liquid crystal display, the display panel 110 includes a liquid crystal layer formed between two substrates, and it may be operated in any known mode such as TN (twisted nematic) mode, VA (vertical alignment) mode, IPS (in-plane switching) mode, FFS (fringe field switching) mode. In the case of an organic light emitting display device, the display panel 110 may be implemented in a top emission method, a bottom emission method, or a dual emission method.

In the display panel 110, a plurality of pixels may be disposed in a matrix form. Each pixel may be composed of subpixels SP of different colors, for example, a white subpixel, a red subpixel, a green subpixel, and a blue subpixel. Each subpixel SP may be defined by the plurality of the data lines DL and the plurality of the gate lines GL.

A subpixel SP may include a thin film transistor (TFT) arranged in a region where a data line DL and a gate line GL intersect, a light emitting element such as a light emitting diode which is emitted according to the data voltage, and a storage capacitor for maintaining the data voltage by being electrically connected to the light emitting element.

For example, when the display device 100 having a resolution of 2,160×3,840 includes four subpixels SP of white W, red R, green G, and blue B, 3,840×4=15,360 data lines DL may be provided by 2,160 gate lines GL and 3,840 data lines DL respectively connected to 4 subpixels WRGB. Each of the plurality of subpixels SP may be disposed in areas in which the plurality of gate lines GL overlap the plurality of data lines DL.

The gate driving circuit 120 is controlled by the timing controller 140, and controls the driving timing of the plurality of subpixels SP by sequentially supplying the scan signals to the plurality of gate lines GL disposed in the display panel 110.

In the display device 100 having a resolution of 2,160×3,840, an operation of sequentially supplying the scan signals to the 2,160 gate lines GL from the first gate line GL1 to the 2,160th gate line GL2160 may be referred to as 2,160-phase driving operation. Otherwise, an operation of sequentially supplying the scan signals to every four gate lines GL, as in a case in which the scan signals are supplied sequentially from first gate line GL1 to fourth gate lines GL4, and then are supplied sequentially from fifth gate line GL5 to eighth gate line GL8, may be referred to as 4-phase driving operation. As described above, an operation in which the scan signals are supplied sequentially to every N number of gate lines may be referred as N-phase driving operation.

The gate driving circuit 120 may include one or more gate driving integrated circuits (GDIC), which may be disposed on one side or both sides of the display panel 110 depending on the driving method. Alternatively, the gate driving circuit 120 may be implemented in a gate-in-panel (GIP) structure embedded in a bezel area of the display panel 110.

The data driving circuit 130 receives digital image data DATA from the timing controller 140, and converts the received digital image data DATA into an analog data voltage. Then, the data driving circuit 130 supplies the analog data voltage to each of the data lines DL at time which the scan signal is supplied through the gate line GL, so that each of the subpixels SP connected to the data lines DL emits light with a corresponding luminance in response to the analog data voltage.

Likewise, the data driving circuit 130 may include one or more source driving integrated circuits (SDIC). Each of the source driving integrated circuits (SDIC) may be connected to a bonding pad of the display panel 110 by a tape automated bonding (TAB) or a chip on glass (COG), or may be directly mounted on the display panel 110.

In some cases, each of the source driving integrated circuits (SDIC) may be integrated with the display panel 110. In addition, each of the source driving integrated circuits (SDIC) may be implemented with a chip on film (COF) structure. In this case, the source driving integrated circuit (SDIC) may be mounted on circuit film to be electrically connected to the data lines DL in the display panel 110 via the circuit film.

The timing controller 140 supplies various control signals to the gate driving circuit 120 and the data driving circuit 130, and controls the operations of the gate driving circuit 120 and the data driving circuit 130. That is, the timing controller 140 controls the gate driving circuit 120 to supply the scan signals in response to a time realized by respective frames, and on the other hand, transmits the image data DATA from an external source to the data driving circuit 130.

Here, the timing controller 140 receives various timing signals, including a vertical synchronization signal Vsync, a horizontal synchronization signal Hsync, a data enable signal DE, and a main clock MCLK, from an external host system 200.

The host system 200 may be any one of a TV (television) system, a set-top box, a navigation system, a personal computer (PC), a home theater system, a mobile device, and a wearable device.

Accordingly, the timing controller 140 generates control signals using the various timing signals received from the external source, and supplies the control signals to the gate driving circuit 120 and the data driving circuit 130.

For example, the timing controller 140 generates various gate control signals, including a gate start pulse GSP, a gate clock GCLK, and a gate output enable signal GOE, to control the gate driving circuit 120. Here, the gate start pulse GSP is used to control the start timing of one or more gate driving integrated circuits (GDIC) of the gate driving circuit 120. In addition, the gate clock GCLK is a clock signal commonly supplied to the one or more gate driving integrated circuits (GDIC) for controlling the shift timing of the scan signals. The gate output enable signal GOE designates timing information of the one or more gate driving integrated circuits (GDIC).

In addition, the timing controller 140 generates various data control signals, including a source start pulse SSP, a source sampling clock SCLK, and a source output enable signal SOE, to control the data driving circuit 130. Here, the source start pulse SSP is used to control the start timing for the data sampling of one or more source driving integrated circuits (SDIC) of the data driving circuit 130. The source sampling clock SCLK is a clock signal for controlling a timing of data sampling in each of the source driving integrated circuits (SDIC). The source output enable signal SOE controls the output timing of the data driving circuit 130.

The display device 100 may further include a power management circuit 150 for supplying or controlling various voltage or current to the display panel 110, the gate driving circuit 120, and the data driving circuit 130.

The power management circuit 150 generates necessary power to drive the display panel 100, the gate driving circuit 120, and the data driving circuit 130 by controlling a direct current (DC) input voltage Vin supplied from the host system 200.

The subpixel SP is positioned at a point where the gate line GL and the data line DL intersect and a light emitting element may be disposed in each of the subpixels SP. For example, the organic light emitting display device may include a light emitting element, such as a light emitting diode in each of the subpixels SP, and may display an image by controlling current flowing through the light emitting elements in response to the data voltage.

The display device 100 may be various types of devices such as a liquid crystal display, an organic light emitting display, and a plasma display panel.

Figure 2:
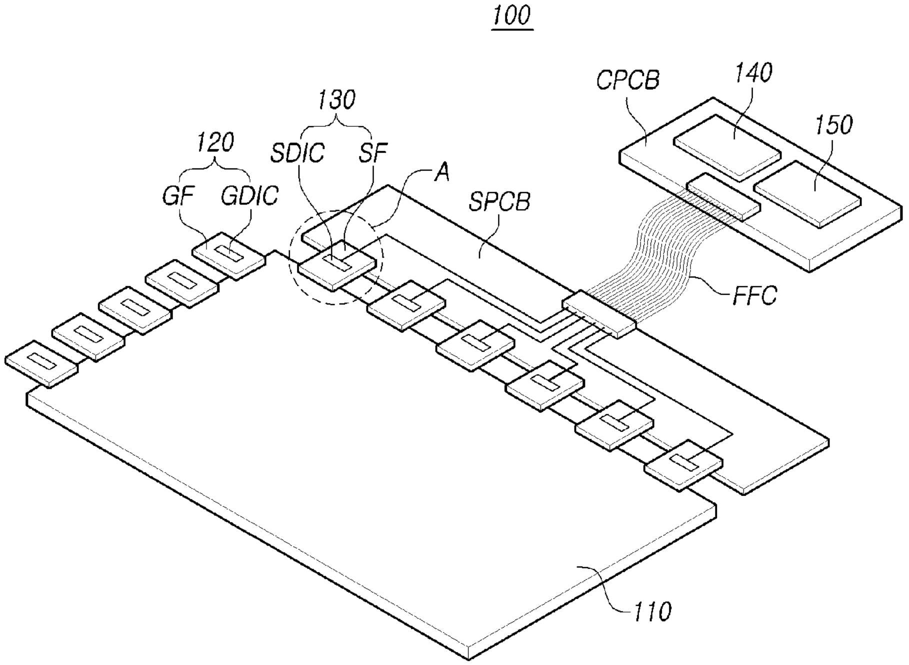
FIG. 2 illustrates a system diagram of the display device according to embodiments of the present disclosure.

FIG. 2 illustrates a system diagram of the display device according to embodiments of the present disclosure.

As an example, FIG. 2 illustrates that each of the source driving integrated circuits SDIC of the data driving circuit 130 and each of the gate driving integrated circuits GDIC of the gate driving circuit 120 in the display device 100 according to embodiments of the present disclosure are implemented with a COF type among various structures among various structures such as a TAB, a COG, and a COF.

One or more gate driving integrated circuits GDIC included in the gate driving circuit 120 may be respectively mounted on the gate film GF, and one side of the gate film GF may be electrically connected to the display panel 110. Also, electrical lines may be disposed on the gate film GF to electrically connect the gate driving integrated circuit GDIC and the display panel 110.

Likewise, the data driving circuit 130 may include one or more source driving integrated circuits SDIC, which may be mounted on a source film SF, respectively. One portion of the source film SF may be electrically connected to the display panel 110. In addition, electrical lines may be disposed on the source films SF to electrically connect the source driving integrated circuits SDIC and the display panel 110.

The display device 100 may include at least one source printed circuit board SPCB in order to connect the plurality of source driving integrated circuits SDIC to other devices by electrical circuit, and a control printed circuit board CPCB in order to mount various control components and electric elements.

The other portion of the source film SF, on which the source driving integrated circuit SDIC is mounted, may be connected to the at least one source printed circuit board SPCB. That is, one portion of source film SF on which the source driving integrated circuit SDIC is mounted may be electrically connected to the display panel 110, and the other portion of the source film SF may be electrically connected to the source printed circuit board SPCB.

The timing controller 140 and a power management circuit 150 may be mounted on the control printed circuit board CPCB. The timing controller 140 may control the operations of the data driving circuit 130 and the gate driving circuit 120. The power management circuit 150 may supply a driving voltage and a driving current, or control a voltage and a current for the data driving circuit 130 and the gate driving circuit 120.

At least one source printed circuit board SPCB and the control printed circuit board CPCB may have circuitry connection by at least one connecting member. The connecting member may be, for example, a flexible printed circuit FPC, a flexible flat cable FFC, or the like. In this case, the connecting member to connecting at least one source printed circuit board SPCB and the control printed circuit board CPCB may be variously changed according to the size and type of the display device 100. At least one source printed circuit board SPCB and the control printed circuit board CPCB may be integrated into a single printed circuit board.

In the display device 100 having the above described configuration, the power management circuit 150 supplies the driving voltage, which is required for a display driving operation or a sensing operation of the characteristic value, to the source printed circuit board SPCB through the flexible printed circuit FPC or the flexible flat cable FFC. The driving voltage supplied to the source printed circuit board SPCB, is transmitted to emit or sense a specific subpixel SP in the display panel 110 via the source driving integrated circuits SDIC.

Each of the subpixels SP arranged in the display panel 110 of the display device 100 may include an organic light emitting diode as a light emitting element and circuit elements, such as a driving transistor to drive it.

The type and number of the circuit elements constituting each of the subpixels SP may be variously determined depending on the function, the design, or the like.

In this case, the data driving circuit 130 may convert the image data DATA transmitted from the timing controller 140 into a data voltage according to a gray level by using a gamma voltage corresponding to a specific gray level and supply the data voltage.

Figure 3:
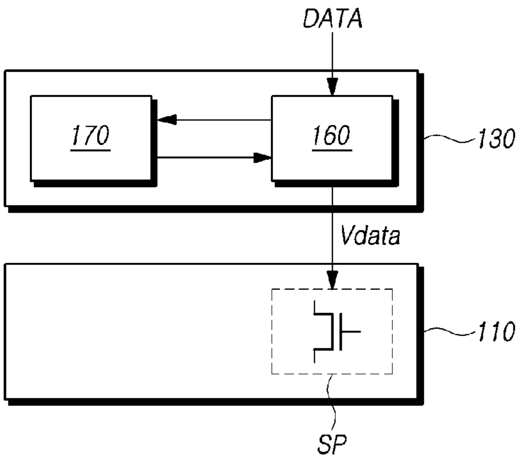
FIG. 3 illustrates a schematic diagram of a data driving circuit generating a data voltage in a display device according to an embodiment of the present disclosure.

FIG. 3 illustrates a schematic diagram of a data driving circuit generating a data voltage in a display device according to an embodiment of the present disclosure.

Referring to FIG. 3, the data driving circuit 130 of the display device 100 according to an embodiment of the present disclosure may include a data voltage output circuit 160 supplying a data voltage Vdata corresponding to the image data DATA received from the timing controller 140 and a gamma voltage generating circuit 170 that generates and transmits a gamma voltage to the data voltage output circuit 160.

The data voltage output circuit 160 receives digital image data DATA from the timing controller 140 and converts the received image data DATA into analog data voltage Vdata to display a gray level of the image data DATA.

At this time, the data voltage output circuit 160 supplies the data voltage Vdata corresponding to each gray level using a gamma voltage transmitted from the gamma voltage generating circuit 170.

The gamma voltage generating circuit 170 receives a reference voltage for generating the gamma voltage from outside and generates the gamma voltage corresponding to a specific gray level using the received reference voltage.

For example, to display 256 gray levels, the gamma voltage generating circuit 170 may generate gamma voltages corresponding to 0 gray level (G0), 1 gray level (G1), 3 gray level (G3), 15 gray level (G15), 31 gray level (G31), 63 gray level (G63), 127 gray level (G127), 191 gray level (G191), and 255 gray level (G255).

The data voltage output circuit 160 receives a gamma voltage corresponding to a specific gray level transmitted from the gamma voltage generating circuit 170, and generates a data voltage corresponding to the gray level of the image data DATA using the received gamma voltage.

That is, when the data voltage output circuit 160 generates the data voltage Vdata corresponding to the 255 gray level (G255), it may use a gamma voltage corresponding to the 255 gray level (G255). Also, when it generates data voltages Vdata between the 191 gray level (G191) and the 255 gray level (G255), it may use a gamma voltage corresponding to the 191 gray level (G191) and a gamma voltage corresponding to the 255 gray level (G255).

Figure 4:
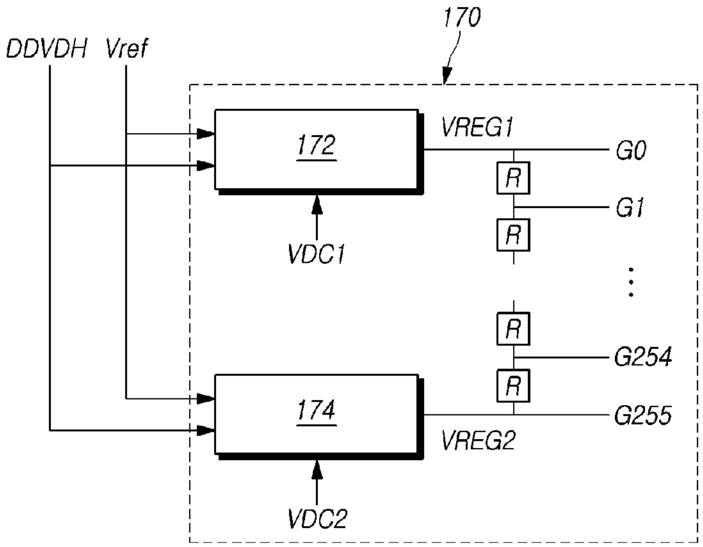
FIG. 4 illustrates a structural diagram of the gamma voltage generating circuit in a display device according to an embodiment of the present disclosure.

FIG. 4 illustrates a structural diagram of the gamma voltage generating circuit in a display device according to an embodiment of the present disclosure.

Referring to FIG. 4, the gamma voltage generating circuit 170 of the display device 100 according to an embodiment of the present disclosure may include a first reference gamma voltage output circuit 172 for generating a first reference gamma voltage VREG1 using a circuit driving voltage DDVDH, a second reference gamma voltage output circuit 174 for generating a second reference gamma voltage VREG2 using the circuit driving voltage DDVDH, and a plurality of resistor strings R for dividing the first reference gamma voltage VREG1 and the second reference gamma voltage VREG2.

The first reference gamma voltage output circuit 172 and the second reference gamma voltage output circuit 174 may be configured as a low drop output (LDO) circuit that converts an input voltage into a desired specific output voltage. Such an LDO circuit may be used to stably generate an output voltage when the difference between the input voltage and the output voltage is not large.

For example, the first reference gamma voltage output circuit 172 may be composed of a LDO circuit that receives the reference voltage Vref and stably generates the first reference gamma voltage VREG1 by applying a first offset voltage VDC1 to the reference voltage Vref.

In addition, the second reference gamma voltage output circuit 174 may be composed of a LDO circuit that receives the reference voltage Vref and stably generates the second reference gamma voltage VREG2 by applying a second offset voltage VDC2 to the reference voltage Vref.

At this time, the reference voltage Vref supplied to the first reference gamma voltage output circuit 172 and the second reference gamma voltage output circuit 174 for generating the reference gamma voltages VREG1, VREG2 may be a DC voltage with a specific level. On the other hand, it may also be a feedback voltage of a high potential driving voltage VDD to apply a change of the high potential driving voltage VDD supplied to the display panel 110.

The first reference gamma voltage VREG1 may be a gamma voltage of 0 gray level G0 supplied to the upper end of the resistor strings, and the second reference gamma voltage VREG2 may be a gamma voltage of 255 gray level G255 supplied to the lower end of the resistor strings.

Accordingly, the gamma voltage generating circuit 170 may generate gamma voltages corresponding to a plurality of gray levels (for example, 0 gray level G0, 1 gray level G1, 3 gray level G3, 15 gray level G15, 31 gray level G31, 63 gray level G63, 127 gray level G127, 191 gray level G191, and 255 gray level G255) by dividing the first reference gamma voltage VREG1 and the second reference gamma voltage VREG2 through the resistor strings.

The gamma voltage generating circuit 170 may generate the gamma voltages corresponding to the low gray level at narrow intervals in order to improve a resolution in the low gray level.

Figure 5:
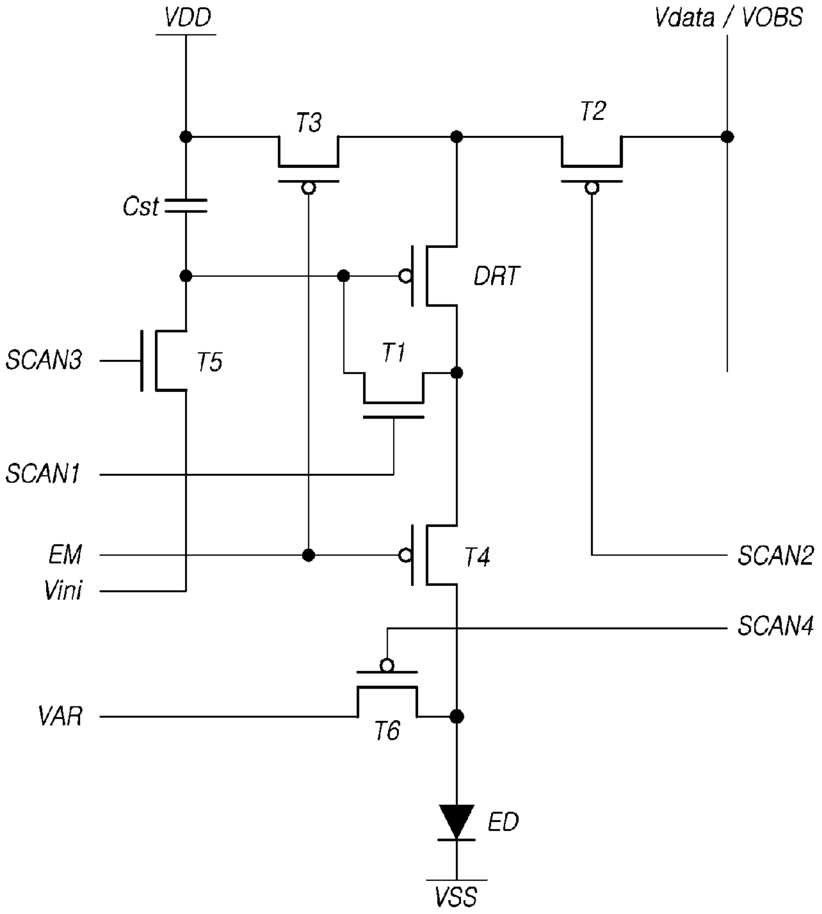
FIG. 5 illustrates a diagram of a subpixel circuit of the display device according to an embodiment of the present disclosure.

FIG. 5 illustrates a diagram of a subpixel circuit of the display device according to an embodiment of the present disclosure.

Referring to FIG. 5, a subpixel SP of the display device 100 according to an embodiment of the present disclosure includes first to sixth switching transistors T1-T6, a driving transistor DRT, a storage capacitor Cst and a light emitting element ED.

Here, the light emitting element ED may be, for example, a self-emissive element capable of emitting light by itself, such as an organic light emitting diode OLED.

In the subpixel SP according to an embodiment of the present disclosure, the second to fourth switching transistors T2-T4, the sixth switching transistor T6, and the driving transistor DRT may be P-type transistors. Also, the first switching transistor T1 and the fifth switching transistor T5 may be N-type transistors.

The P-type transistor is relatively more reliable than the N-type transistor. The P-type transistor has an advantage that the current flowing through the light emitting element ED is not shaken by the storage capacitor Cst since the drain electrode is fixed to the high potential driving voltage VDD. Therefore, the current tends to be supplied stably.

For example, the P-type transistor may be connected to the anode electrode of the light emitting element ED. At this time, a constant current can flow regardless of changes in the current and threshold voltage of the light emitting element ED when the switching transistors T4, T6 connected to the light emitting element ED operate in a saturation region. So, reliability is relatively high.

In this subpixel SP structure, the N-type transistors T1, T5 may be oxide transistors formed using a semiconducting oxide (for example, transistors with a channel formed from a semiconducting oxide such as indium, gallium, zinc oxide or IGZO), and other P-type transistors DRT, T2-T4, T6 may be silicon transistors formed from semiconductors such as silicon (for example, transistors with a polysilicon channel formed by low temperature process like LTPS or low temperature polysilicon).

The oxide transistor has a relatively low leakage current compared to the silicon transistor. Therefore, when it is implemented using the oxide transistor, leakage current from the gate electrode of the driving transistor DRT is reduced, and there is an effect that can reduce the defect of image quality like flicker.

Meanwhile, the remaining P-type transistors DRT, T2-T4, T6 except for the first switching transistor T1 and the fifth switching transistor T5 corresponding to the N-type transistor may be made of low temperature polysilicon.

A first scan signal SCAN1 is supplied to the gate electrode of the first switching transistor T1. A drain electrode of the first switching transistor T1 is connected to a gate electrode of the driving transistor DRT.

A source electrode of the first switching transistor T1 is connected to a source electrode of the driving transistor DRT.

The first switching transistor T1 is turned on by the first scan signal SCAN1, and controls the operation of the driving transistor DRT using a high potential driving voltage VDD stored in the storage capacitor Cst.

The first switching transistor T1 may be formed of an N-type MOS transistor to constitute an oxide transistor. Since the N-type MOS transistor uses electrons as carriers, it has higher mobility and faster switching speed than the P-type MOS transistor.

A second scan signal SCAN2 is supplied to the gate electrode of the second switching transistor T2. Data voltage Vdata or bias voltage VOBS may be supplied to the drain electrode of the second switching transistor T2. A source electrode of the second switching transistor T2 is connected to a drain electrode of the driving transistor DRT.

The second switching transistor T2 is turned on by the second scan signal SCAN2 to supply the data voltage Vdata to the drain electrode of the driving transistor DRT.

A light emitting signal EM is supplied to the gate electrode of the third switching transistor T3. The high potential driving voltage VDD is supplied to a drain electrode of the third switching transistor T3. A source electrode of the third switching transistor T3 is connected to a drain electrode of the driving transistor DRT.

The third switching transistor T3 is turned on by the light emitting signal EM to supply the high potential driving voltage VDD to the drain electrode of the driving transistor DRT.

The light emitting signal EM is supplied to the gate electrode of the fourth switching transistor T4. A drain electrode of the fourth switching transistor T4 is connected to a source electrode of the driving transistor DRT. A source electrode of the fourth switching transistor T4 is connected to an anode electrode of the light emitting element ED.

The fourth switching transistor T4 is turned on by the light emitting signal EM to supply a driving current to the anode electrode of the light emitting element ED.

A third scan signal SCAN3 is supplied to a gate electrode of the fifth switching transistor T5.

Here, the third scan signal SCAN3 may be the first scan signal SCAN1 supplied to a subpixel SP at another position. For example, when the first scan signal SCAN1 is supplied to nth gate line, the third scan signal SCAN3 may be the first scan signal SCAN1 supplied to (n−9)th gate line. That is, the third scan signal SCAN3 may be used as the first scan signal SCAN1 at another gate line GL according to a driving phase of the display panel 110.

A stabilization voltage *Vini* is supplied to a drain electrode of the fifth switching transistor T5. A source electrode of the fifth switching transistor T5 is connected to a gate electrode of the driving transistor DRT and the storage capacitor Cst.

The fifth switching transistor T5 is turned on by the third scan signal SCAN3 to supply the stabilization voltage Vini to the gate electrode of the driving transistor DRT.

A fourth scan signal SCAN4 is supplied to a gate electrode of the sixth switching transistor T6.

Here, the fourth scan signal SCAN4 may be the second scan signal SCAN2 supplied to a subpixel SP at another position. For example, when the second scan signal SCAN2 is supplied to nth gate line, the fourth scan signal SCAN4 may be the second scan signal SCAN2 supplied to (n−1)th gate line. That is, the fourth scan signal SCAN4 may be used as the second scan signal SCAN2 at another gate line GL according to a driving phase of the display panel 110.

A reset voltage VAR is supplied to the drain electrode of the sixth switching transistor T6. The source electrode of the sixth switching transistor T6 is connected to the anode electrode of the light emitting element ED.

The sixth switching transistor T6 is turned on by the fourth scan signal SCAN4 to supply the reset voltage VAR to the anode electrode of the light emitting element ED.

The gate electrode of the driving transistor DRT is connected to the drain electrode of the first switching transistor T1. The drain electrode of the driving transistor DRT is connected to the source electrode of the second switching transistor T2. The source electrode of the driving transistor DRT is connected to the source electrode of the first switching transistor T1.

The driving transistor DRT is turned on by the voltage difference between the source electrode and the drain electrode of the first switching transistor T1 to supply a driving current to the light emitting element ED.

A high potential driving voltage VDD is supplied to one side of the storage capacitor Cst and the other side of the storage capacitor Cst is connected to the gate electrode of the driving transistor DRT. The storage capacitor Cst stores a voltage of the gate electrode of the driving transistor DRT.

The anode electrode of the light emitting element ED is connected to the source electrode of the fourth switching transistor T4 and the source electrode of the sixth switching transistor T6. A low potential driving voltage VSS is supplied to a cathode electrode of the light emitting element ED.

The light emitting element ED emits light with a predetermined luminance due to the driving current controlled by the driving transistor DRT.

At this time, the stabilization voltage Vini is supplied to stabilize the change of the capacitance formed in the gate electrode of the driving transistor DRT. The reset voltage VAR is supplied to reset the anode electrode of the light emitting element ED.

When the reset voltage VAR is supplied to the anode electrode of the light emitting element ED in a state that the fourth switching transistor T4 is turned off, the anode electrode of the light emitting element ED can be reset.

The sixth switching transistor T6 for supplying the reset voltage VAR is connected to the anode electrode of the light emitting element ED.

In order for the driving operation of the driving transistor DRT and the resetting operation of the anode electrode of the light emitting element ED to be separately performed, the third scan signal SCAN3 for driving or resetting the driving transistor DRT and the fourth scan signal SCAN4 for controlling the supply of the reset voltage VAR to the anode electrode of the light emitting element ED are separated from each other.

When the switching transistors T5, T6 for supplying the stabilization voltage *Vini* and the reset voltage VAR are turned on, the fourth switching transistor T4 which connects the source electrode of the driving transistor DRT to the anode electrode of the light emitting element ED may be turned off. As a result, the driving current of the driving transistor DRT is blocked so as not to flow to the anode electrode of the light emitting element ED, so that the anode electrode is not affected by voltages other than the reset voltage VAR.

As described above, the subpixel SP including the seven transistors DRT, T1, T2, T3, T4, T5, T6 and one capacitor Cst may be referred to as a 7T1C structure.

Here, the 7T1C structure is shown as an example among various type of subpixel SP circuits. The structure and number of transistors and capacitors constituting the subpixel SP may be variously changed. Meanwhile, each of the plurality of subpixels SP may have the same structure, or some of the plurality of subpixels SP may have different structures.

Figure 6:
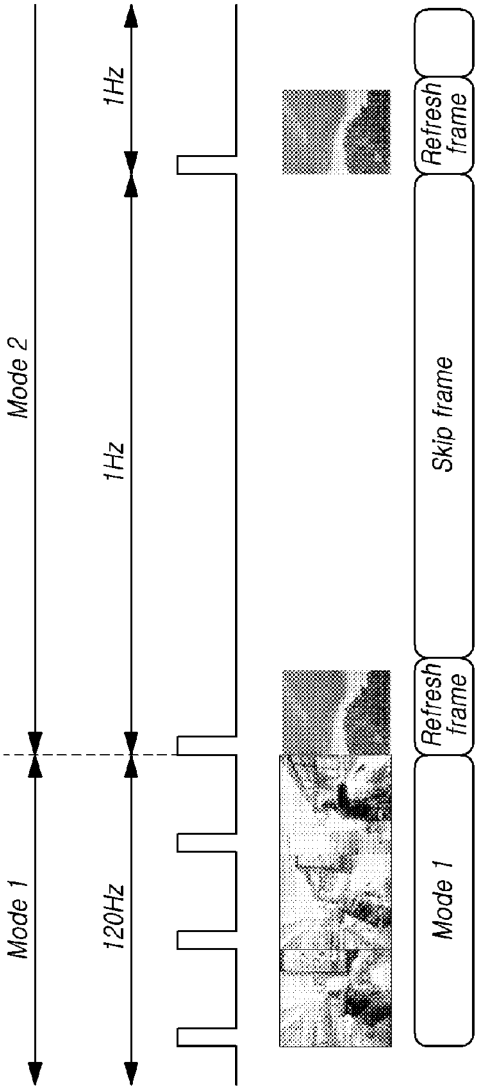
FIG. 6 illustrates a schematic diagram of driving modes based on frequency changes in a display device according to an embodiment of the present disclosure.

FIG. 6 illustrates a schematic diagram of driving modes based on frequency changes in a display device according to an embodiment of the present disclosure.

Referring to FIG. 6, the display device 100 according to an embodiment of the present disclosure may include a first mode Mode1 in which moving image data are displayed at a high speed first frequency and a second mode Mode2 in which still image data or low speed image data are displayed at a low speed second frequency (or predetermined driving frequency) lower than the high speed first frequency.

For example, in the first mode Mode1, moving image data may be displayed on the display panel 110 in full color at a frequency of 120 Hz corresponding to the first frequency. While the display device 100 is operated in the first mode Mode1, the subpixels SP of the display panel 110 display moving image data transmitted from the timing controller 140 for every 120 frame periods.

As described above, a period in which image data are continuously displayed on the display panel 110 at a high speed driving frequency may be referred to as a refresh frame. For example, when the driving frequency is 120 Hz, all 120 frames for 1 second in the first mode Mode1 will be refresh frames in which image data are displayed.

Meanwhile, when the display device 100 is operated in the second mode Mode2 in which still image data or low speed image data are displayed, the display device 100 may display a designated image data in an initial period of the second mode Mode2 on the display panel 110, and may not display the image data on the display panel 110 for the remaining period.

For example, when entering the second mode Mode2, the display device 100 may change the driving frequency from the first frequency of 120 Hz to the second frequency of 1 Hz. At this time, the image data displayed in the last period of the first mode Mode1 may be displayed on the display panel 110 in the second mode Mode2 changed to a frequency of 1 Hz.

For example, in the second mode Mode2 driven at 1 Hz, the display device 100 may display the image data displayed in the last frame of the first mode Mode1 on the display panel 110 once, and may not display the image data during the remaining time.

In this case, the subpixel SP may display the image data once in the second mode Mode2, but may maintain the voltage stored in the storage capacitor Cst for the remaining time. As described above, a period in which the voltage stored in the storage capacitor Cst is maintained without transmitting image data to the display panel 110 may be referred to as a skip frame. For example, when the driving frequency is 120 Hz, the first frame of the second mode Mode2 will be a refresh frame in which image data are displayed, and the remaining frames are skip frames in which image data are not transmitted.

As described above, power consumption may be reduced by not transmitting image data DATA for a certain period (e.g., the skip frame) in the second mode Mode2 driven at low speed driving frequency lower than the high speed driving frequency.

However, in the process of switching from the first mode Mode1 driven at the high speed driving frequency to the second mode Mode2 driven at the low speed driving frequency, a flicker phenomenon may occur due to the luminance deviation.

Figure 7:
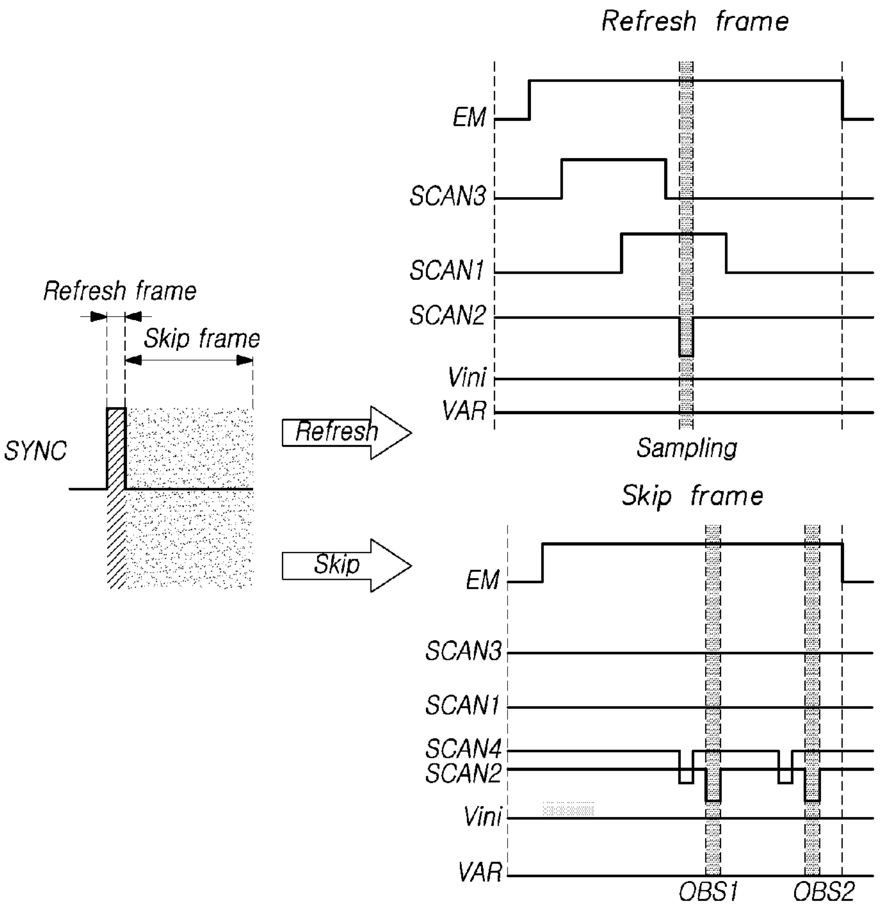
FIG. 7 illustrates driving timing in a second mode driven at a low speed driving frequency in the display device according to an embodiment of the present disclosure.

FIG. 7 illustrates a driving timing in a second mode driven at a low speed driving frequency in the display device according to an embodiment of the present disclosure.

Referring to FIG. 7, the second mode Mode2 driven at a low speed driving frequency in the display device 100 according to an embodiment of the present disclosure may include a first period and a second period which are divided from one frame period based on a synchronization signal SYNC.

The first period may be a refresh frame in which image data DATA are displayed, and the second period may be a skip frame in which image data DATA are not transmitted.

A data voltage Vdata for driving the subpixel SP, a stabilization voltage Vini, and a reset voltage VAR may be supplied at the refresh frame.

A refresh frame is a period for initializing the voltage charged or remaining in the storage capacitor Cst and the driving transistor DRT. A refresh frame may be partially provided in the start period of each frame in the low speed second mode Mode2. Effects of the data voltage Vdata and the driving voltage stored in the subpixel SP in the high speed first mode Mode1 may be removed in the refresh frame.

After the refresh operation is completed within the refresh frame, the light emitting element ED may emit light according to the data voltage Vdata supplied to the subpixel SP.

Meanwhile, a sampling process Sampling for compensating for a characteristic value (threshold voltage or mobility) of the driving transistor DRT may be performed within the refresh frame.

For example, when the first switching transistor T1 is turned on by the first scan signal SCAN1 to electrically connect the gate electrode and the source electrode of the driving transistor DRT, the gate electrode and the source electrode of the driving transistor DRT have substantially equal potentials. At this time, when the second switching transistor T2 is turned on by the second scan signal SCAN2 to supply the data voltage Vdata, it forms a current path until the voltage difference Vgs between the gate electrode and the source electrode of the driving transistor DRT reaches the threshold voltage of the driving transistor DRT. Accordingly, the voltages of the gate electrode and the source electrode of the driving transistor DRT are charged.

That is, when the data voltage Vdata is supplied to the drain electrode of the driving transistor DRT, the voltages of the gate electrode and the source electrode of the driving transistor DRT rise to a voltage difference between the data voltage and the threshold voltage. Due to this, the threshold voltage of the driving transistor DRT may be compensated.

As described above, the process of compensating for the characteristic value of the driving transistor DRT by the sampling process may correspond to internal compensation.

The skip frame is a period for charging or setting the data voltage Vdata and the driving voltage of each frame. The skip frame continues until the refresh frame of the next frame starts after the refresh frame is completed in each frame.

In the skip frame, the driving transistor DRT and the light emitting element ED are driven according to the scan signal SCAN and the light emitting signal EM. That is, the initialization operation and supply of the data voltage Vdata may be performed in a refresh frame period of one frame period, and the light emitting element ED may emit light in a skip frame period.

In the skip frame, the anode electrode of the light emitting element ED is reset to the reset voltage VAR. In this case, the anode electrode of the light emitting element ED may be reset to a predetermined voltage in order to improve flicker generated while the skip frame is continued by low speed driving operation in the skip frame.

Specifically, the data voltage Vdata in the skip frame maintains a low logic level L. Meanwhile, in order to reduce a hysteresis effect that may occur in the driving transistor DRT and improve response characteristic, a bias voltage VOBS may be supplied in the skip frame.

For example, the driving transistor DRT may be in an on-bias state through which a large current flows between the drain electrode and the source electrode of the driving transistor DRT by supplying a peak white grayscale voltage to the gate electrode of the driving transistor DRT.

On the other hand, the driving transistor DRT may be in an off-bias state through which current does not flow between the drain electrode and the source electrode of the driving transistor DRT by supplying a peak black grayscale voltage to the gate electrode of the driving transistor DRT.

The peak white grayscale voltage refers to a voltage supplied to the gate electrode of the driving transistor DRT to emit the light emitting element ED with a peak white grayscale, and the peak black grayscale voltage refers to a voltage supplied to the gate electrode of the driving transistor DRT to emit the light emitting element ED with a peak black grayscale. For example, when a grayscale value is expressed as an 8-bit digital value, the peak black grayscale may mean minimum value “0”, and the peak white grayscale may mean maximum value “255”.

At this time, since the sweep curves of the on-bias state and the off-bias state in the P-type driving transistor DRT are not same, a current flowing between the drain electrode and the source electrode of the driving transistor DRT in the same grayscale may be different.

At this time, in the gray expression, the current characteristic flowing between the drain electrode and the source electrode of the driving transistor DRT is changed between the on-bias state and the off-bias state due to the voltage deviation between the gate electrode and the source electrode of the driving transistor DRT. Such phenomenon is called a hysteresis, which may cause an afterimage.

In addition, the difference of driving current flowing through the drain electrode and the source electrode of the driving transistor DRT does not stabilize the driving characteristics of the light emitting element ED, and may cause a luminance deviation.

In particular, when an operation mode of the display device 100 is changed from the first mode Mode1 driven at a high speed driving frequency to the second mode Mode2 driven at a low speed driving frequency lower than the high speed driving frequency, the afterimage due to the hysteresis phenomenon can be easily recognized.

Accordingly, while the display device 100 operates in the second mode Mode2 driven at the low speed driving frequency, on-bias processes OBS1, OBS2 for setting the driving transistor DRT to an on-bias state may be performed before the emitting period due to the light emitting signal EM of low logic level L starts in order to reduce the recognition of an afterimage due to the hysteresis phenomenon.

For the purpose of the above, the driving transistor DRT may be on-bias state by supplying the bias voltage VOBS to the drain electrode or the source electrode of the driving transistor DRT before the emitting period starts.

For example, the bias voltage VOBS may be supplied to the drain electrode of the driving transistor DRT through the data line DL before the emitting period starts within a skip frame of the second mode Mode2 driven at a low speed driving frequency.

Alternatively, the bias voltage VOBS may be supplied to the source electrode of the driving transistor DRT through a separate bias voltage supply line before the emitting period starts within a skip frame of the second mode Mode2 driven at a low speed driving frequency.

Here, a case is illustrated as an example in which the bias voltage VOBS is supplied to the drain electrode of the driving transistor DRT through the data line DL before the emitting period starts within a skip frame of the second mode Mode2 driven at a low speed driving frequency.

The first scan signal SCAN1 and the third scan signal SCAN3 maintain a low logic level L, and the second scan signal SCAN2 and the fourth scan signal SCAN4 maintains a high logic level H in a skip frame.

Accordingly, the data voltage Vdata is not supplied in the skip frame. In addition, the first and fourth switching transistors T1, T4 maintain a turned-off state in a skip frame.

The second scan signal SCAN2 and the fourth scan signal SCAN4 may be supplied to the odd gate line and the even gate line with a phase difference. The second scan signal SCAN2 and the fourth scan signal SCAN4 may maintain a low logic level L in a part of a skip frame and maintain a high logic level H in the remaining period.

The second switching transistor T2 is turned on in a period in which the second scan signal SCAN2 maintains a low logic level L, and the sixth switching transistor T6 is turned on in a period in which the fourth scan signal SCAN4 maintains a low logic level L.

The second switching transistor T2 of turned-on state supplies the bias voltage VOBS to the driving transistor DRT in the skip frame period, and the sixth switching transistor T6 of turned-on state supplies the reset voltage VAR to the anode electrode of the light emitting element ED.

The light emitting signal EM maintains a high logic level H in the skip frame. The third switching transistor T3 and the fourth switching transistor T4 are turned on in the period in which the light emitting signal EM maintains the low logic level L.

Since the light emitting signal EM maintains the high logic level H in a skip frame, the third switching transistor T3 and the fourth switching transistor T4 are turned off. Accordingly, the current of the driving transistor DRT may be cut off while the anode electrode of the light emitting element ED is reset.

Figure 8:
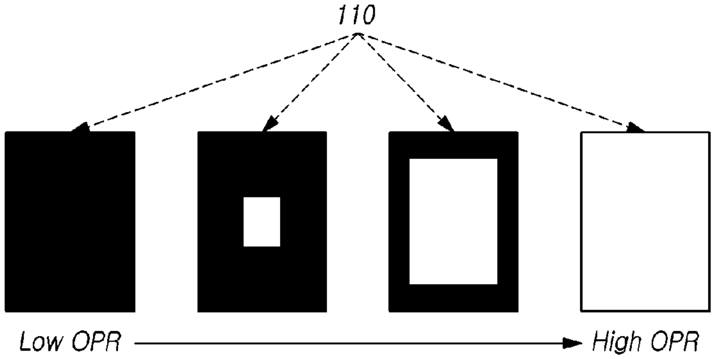
FIG. 8 illustrates a diagram of a change in a pattern of image data displayed through the display panel in the display device according to an embodiment of the present disclosure.

FIG. 8 illustrates a diagram of a change in a pattern of image data displayed through the display panel in the display device according to an embodiment of the present disclosure.

Referring to FIG. 8, when the image data DATA supplied to the display panel 110 is a moving picture, the pattern of the image data DATA displayed through the display panel 110 in the display device 100 according to an embodiment of the present disclosure is changed over time.

Accordingly, as the pattern of the image data DATA is changed, an on-pixel ratio (OPR) of the subpixels SP emitted through the display panel 110 during one frame is changed and the gray level of the display panel 110 during one frame is changed.

When the display panel 110 has an on-pixel ratio (OPR) of a low gray level close to black color during one frame, the magnitude of the voltage drop (IR drop) of the high potential driving voltage VDD transmitted through the display panel 110 is reduced since the number of subpixels SP being supplied with the high potential driving voltage VDD is small.

On the other hand, when the display panel 110 has an on-pixel ratio (OPR) of a high gray level close to white color during one frame, the magnitude of the voltage drop (IR drop) of the high potential driving voltage VDD transmitted through the display panel 110 is increased since the number of subpixels SP being supplied with the high potential driving voltage VDD is big.

As described above, since the voltage drop of the high potential driving voltage VDD supplied to the display panel 110 is changed as the pattern of the image data DATA is changed, a deviation occurs in the reference gamma voltages VREG1, VREG2 generated by the gamma voltage generating circuit 170 which uses the high potential driving voltage VDD as a reference voltage.

Figure 9:
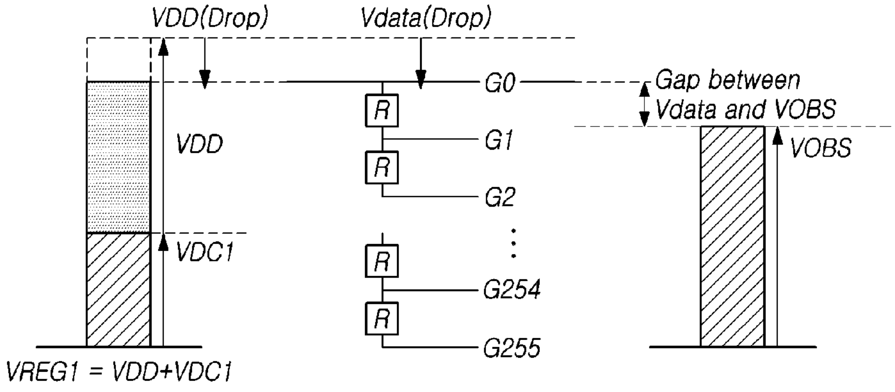
FIG. 9 illustrates a conceptual diagram of a phenomenon in which a deviation occurs in a reference gamma voltage according to a change in a pattern of image data in a display device according to an embodiment of the present disclosure.

FIG. 9 illustrates a conceptual diagram of a phenomenon in which a deviation occurs in a reference gamma voltage according to a change in a pattern of image data in a display device according to an embodiment of the present disclosure.

Referring to FIG. 9, the first reference gamma voltage output circuit 172 generating the first reference gamma voltage VREG1 and the second reference gamma voltage output circuit 174 generating the second reference gamma voltage VREG2 in the gamma voltage generating circuit 170 of the display device 100 according to an embodiment of the present disclosure may use the high potential driving voltage VDD as the reference voltage Vref.

In this case, since the on-pixel ratio (OPR) of the display panel 110 is changed according to a change in the pattern of the input image data DATA, a level of the high potential driving voltage VDD transmitted through the display panel 110 may be changed. Accordingly, the first reference gamma voltage VREG1 generated from the first reference gamma voltage output circuit 172 and the second reference gamma voltage VREG2 generated from the second reference gamma voltage output circuit 174 may be changed.

As a result, the data voltage Vdata supplied to the display panel 110 in the refresh frame period is changed according to the pattern of the image data DATA, whereas the bias voltage VOBS supplied to the display panel 110 has a constant value in the skip frame period (see the gap between Vdata and VOBS as shown in FIG. 9). Therefore, the large luminance deviation between the refresh frame period and the skip frame period may be recognized as flicker in the user's view.

In order to reduce the defects of the image quality, the display device 100 of the present disclosure controls the reference gamma voltages VREG1, VREG2 and the bias voltage VOBS together depending on the high potential driving voltage VDD, thereby it is possible to reduce a luminance deviation between a refresh frame period and a skip frame period, and to improve a degradation of image quality due to flicker.

For the purpose of above, the display device 100 of the present disclosure may include a high potential driving voltage feedback line for detecting the high potential driving voltage VDD supplied to the display panel 110.

Figure 10:
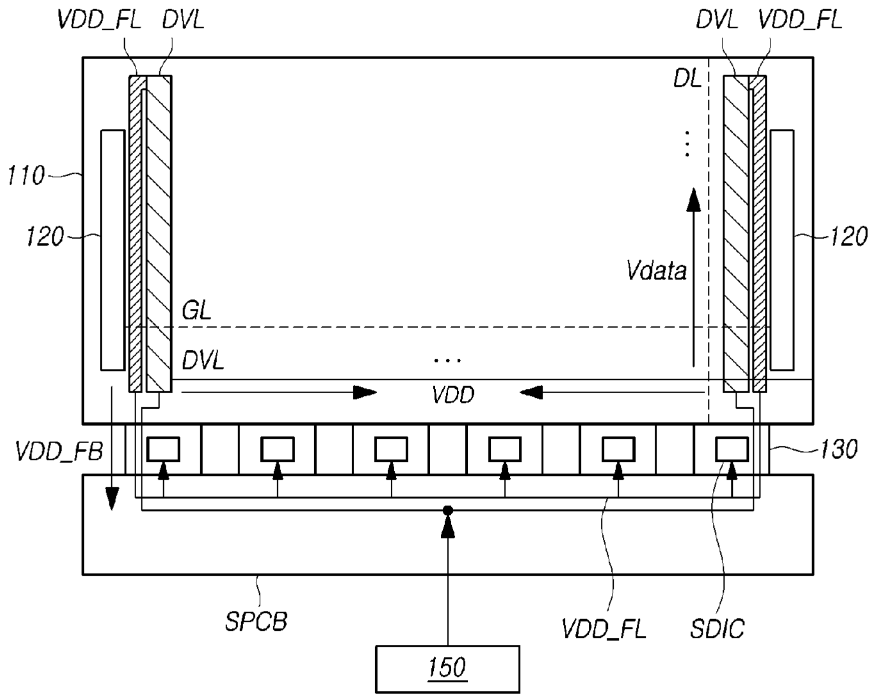
FIG. 10 illustrates a structure for generating a reference gamma voltage and a bias voltage by using a feedback high potential driving voltage detected through a high potential driving voltage feedback line in a display device according to an embodiment of the present disclosure.

FIG. 10 illustrates a structure for generating a reference gamma voltage and a bias voltage by using a feedback high potential driving voltage detected through a high potential driving voltage feedback line in a display device according to an embodiment of the present disclosure.

Referring to FIG. 10, the display device 100 according to an embodiment of the present disclosure may include a display panel 110 in which a driving voltage line DVL supplying a high potential driving voltage VDD and a high potential driving voltage feedback line VDD_FL supplying a feedback high potential driving voltage VDD_FB are disposed, a power management circuit 150 for supplying the high potential driving voltage VDD to the display panel 110, and a data driving circuit 130 for generating a reference gamma voltage VREG and a bias voltage VOBS using the feedback high potential driving voltage VDD_FB.

A bias voltage generating circuit (not shown) generating the bias voltage VOBS for reducing hysteresis of the driving transistor DRT may be located in the power management circuit 150, or in the data driving circuit 130. Here, it is illustrated that it is located in the data driving circuit 130.

The data driving circuit 130 may receive the feedback high potential driving voltage VDD_FB transmitted through the high potential driving voltage feedback line VDD_FL arranged on the display panel 110, and generate the reference gamma voltage VREG corresponding to the variation value of the high potential driving voltage VDD.

Also, the data driving circuit 130 may include the bias voltage generating circuit which receives the feedback high potential driving voltage VDD_FB transmitted through the high potential driving voltage feedback line VDD_FL arranged on the display panel 110 and generates the bias voltage VOBS corresponding to the variation value of the high potential driving voltage VDD.

The levels and output timings of the data voltage Vdata and the bias voltage VOBS of the data driving circuit 130 may be controlled by the timing controller 140.

The high potential driving voltage VDD may be transmitted through the driving voltage lines DVL which is extended through the data driving circuit 130 and arranged in the horizontal and vertical directions on the display panel 110.

At this time, the high potential driving voltage feedback line VDD_FL may be connected to the ends of the driving voltage lines DVL arranged on the left and right sides of the display panel 110, respectively. The high potential driving voltage feedback line VDD_FL may be extended from an end of a driving voltage line DVL arranged outside the display panel 110 and electrically connected to the data driving circuit 130. The feedback high potential driving voltage VDD_FB transmitted through the high potential driving voltage feedback line VDD_FL is supplied to the data driving circuit 130.

At this time, the high potential driving voltage feedback line VDD_FL for transmitting the feedback high potential driving voltage VDD_FB may be arranged on the side of the display panel 110 or may be arranged in the form of a loop along the non-display area surrounding a display area of the display panel 110. The high potential driving voltage feedback line VDD_FL may be arranged in various shapes in the display panel 110.

Figure 11:
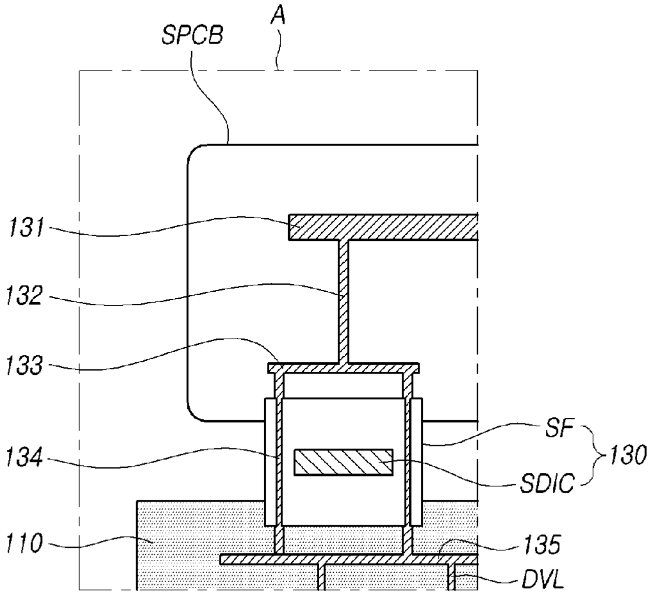
FIG. 11 illustrates a diagram of a transmission path of a high potential driving voltage in a display device according to an embodiment of the present disclosure.

FIG. 11 illustrates a diagram of a transmission path of a high potential driving voltage in a display device according to an embodiment of the present disclosure.

Here, part A shown in FIG. 2 is illustrated in FIG. 11.

Referring to FIG. 11, in the display device 100 according to an embodiment of the present disclosure, a plurality of subpixels SP defined by a plurality of data lines DL and a plurality of gate lines GL crossing each other are disposed on the display panel 110.

In this case, each subpixel SP receives the high potential driving voltage VDD through a plurality of driving voltage lines DVL arranged in parallel to the plurality of data lines DL.

The plurality of driving voltage lines DVL may be arranged between the plurality of data lines DL so as to be parallel to the plurality of data lines DL, respectively, or may be arranged to be shared between the left and right adjacent two subpixels SP.

The plurality of driving voltage lines DVL may be commonly connected to a common driving voltage line 135 arranged in an upper bezel area of the display panel 110.

The high potential driving voltage VDD transmitted from the power management circuit 150 may be supplied to the common driving voltage line 135 through the plurality of data driving circuits 130.

In order to transmit the high potential driving voltage VDD to the plurality of driving voltage lines DVL, a first driving voltage supply line 131, a second driving voltage supply line 132, a third driving voltage supply line 133, and a fourth driving voltage supply line 134 may be disposed.

The first driving voltage supply line 131, the second driving voltage supply line 132, and the third driving voltage supply line 133 may be electrically connected to each other in the source printed circuit board SPCB.

The fourth driving voltage supply line 134 may be arranged to be branched to both sides or one side of the source driving integrated circuit SDIC in the data driving circuit 130. Furthermore, the fourth driving voltage supply line 134 may electrically connect the third driving voltage supply line 133 and the common driving voltage line 135.

The third driving voltage supply line 133 may be disposed in a region adjacent to the source film SF and electrically connected to the fourth driving voltage supply line 134 arranged in the data driving circuit 130.

Since the first driving voltage supply line 131 is a portion in which the high potential driving voltage VDD transmitted from the power management circuit 150 is densely supplied, the first driving voltage supply line 131 may have a relatively larger area than that an area of the third driving voltage supply line 133.

The second driving voltage supply line 132 is branched from the first driving voltage supply line 131 and may be arranged to have a constant interval. Also, the second driving voltage supply line 132 is connected to the third driving voltage supply line 133.

At this time, since the second driving voltage supply line 132 is arranged in front of an area where the high potential driving voltage VDD is branched through the plurality of driving voltage lines DVL, the second driving voltage supply line 132 may have a relatively higher current density rather than a current density of the fourth driving voltage supply line 134 and a current density of the driving voltage line DVL.

Accordingly, since the temperature of the second driving voltage supply line 132 is increased due to the high density current, the possibility of failure increases.

Meanwhile, the data driving circuit 130 may be formed to a group by arranging several source driving integrated circuits SDIC to supply the high potential driving voltage VDD in a group unit.

Figure 12:
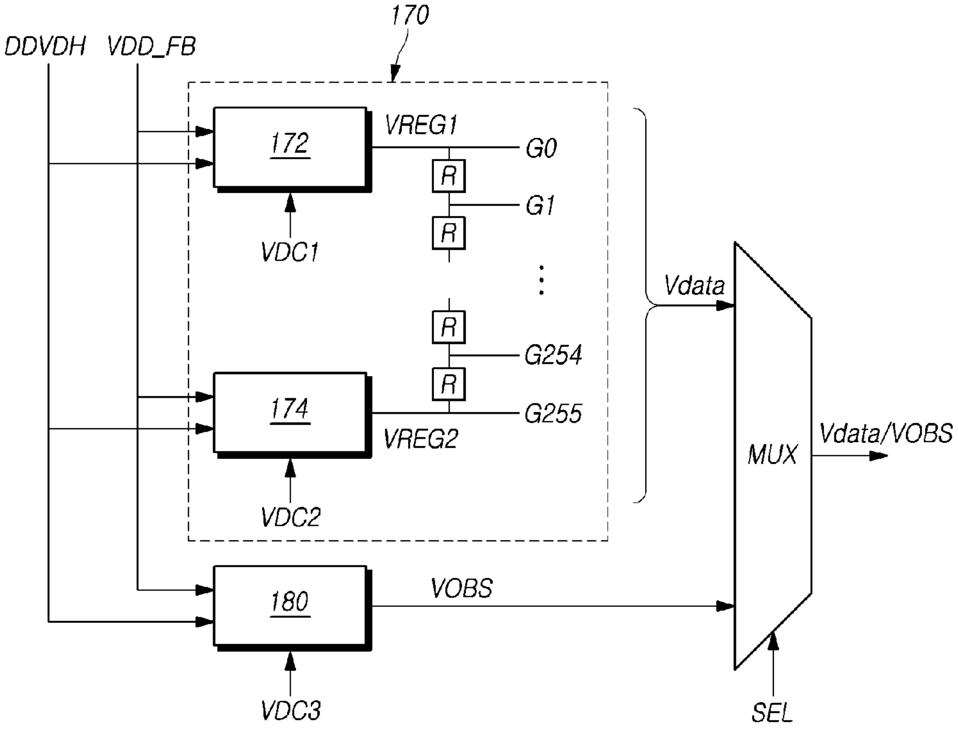
FIG. 12 illustrates a structural diagram of the gamma voltage generating circuit and the bias voltage generating circuit in a display device according to an embodiment of the present disclosure.

FIG. 12 illustrates a structural diagram of the gamma voltage generating circuit and the bias voltage generating circuit in a display device according to an embodiment of the present disclosure.

Referring to FIG. 12, the data driving circuit 130 of the display device 100 according to an embodiment of the present disclosure may include the gamma voltage generating circuit 170 and a bias voltage generating circuit 180 which use the feedback high potential driving voltage VDD_FB as a reference voltage, and a multiplexer MUX for transmitting selectively the data voltage Vdata or the bias voltage VOBS to the display panel 110 by a selection signal SEL.

The gamma voltage generating circuit 170 may include a first reference gamma voltage output circuit 172 for generating a first reference gamma voltage VREG1 using a circuit driving voltage DDVDH, a second reference gamma voltage output circuit 174 for generating a second reference gamma voltage VREG2 using the circuit driving voltage DDVDH, and a plurality of resistor strings R for dividing the first reference gamma voltage VREG1 and the second reference gamma voltage VREG2.

The first reference gamma voltage output circuit 172 and the second reference gamma voltage output circuit 174 may be configured as a low drop output (LDO) circuit that converts the feedback high potential driving voltage VDD_FB into a desired specific output voltage. Such an LDO circuit may be used to stably generate an output voltage when the difference between the input voltage and the output voltage is not large.

The first reference gamma voltage output circuit 172 may receive the feedback high potential driving voltage VDD_FB and stably generate the first reference gamma voltage VREG1 by applying a first offset voltage VDC1 to the feedback high potential driving voltage VDD_FB.

In addition, the second reference gamma voltage output circuit 174 may receive the feedback high potential driving voltage VDD_FB and stably generate the second reference gamma voltage VREG2 by applying a second offset voltage VDC2 to the feedback high potential driving voltage VDD_FB.

The first reference gamma voltage VREG1 may be a gamma voltage of 0 gray level G0 supplied to the upper end of the resistor strings, and the second reference gamma voltage VREG2 may be a gamma voltage of 255 gray level G255 supplied to the lower end of the resistor strings.

Accordingly, the gamma voltage generating circuit 170 may generate gamma voltages corresponding to a plurality of gray levels (for example, 0 gray level G0, 1 gray level G1, 3 gray level G3, 15 gray level G15, 31 gray level G31, 63 gray level G63, 127 gray level G127, 191 gray level G191, and 255 gray level G255) by dividing the first reference gamma voltage VREG1 and the second reference gamma voltage VREG2 according to a variation of the high potential driving voltage VDD supplied to the display panel 110.

The bias voltage generating circuit 180 may receive the feedback high potential driving voltage VDD_FB and generate stably the bias voltage VOBS by applying a third offset voltage VDC3 to the feedback high potential driving voltage VDD_FB.

The bias voltage generating circuit 180 may be formed of a low drop output (LDO) circuit for converting the feedback high potential driving voltage VDD_FB into a desired specific output voltage.

As a result, the gamma voltage generating circuit 170 generates the reference gamma voltages VREG1, VREG2 by applying the variation of the feedback high potential driving voltage VDD_FB, and the bias voltage generating circuit 180 generates the bias voltage VOBS by applying the variation of the feedback high potential driving voltage VDD_FB. Therefore, even when the pattern of the image data DATA is changed, it is possible to reduce a deviation between the data voltage Vdata supplied in the refresh frame period and the bias voltages VOBS supplied in the skip frame period, and improve flicker.

The multiplexer MUX may supply the data voltage Vdata through the data line DL in the refresh frame period and the bias voltage VOBS through the data line DL in the skip frame period according to the selection signal SEL supplied from the timing controller 140.

Figure 13:
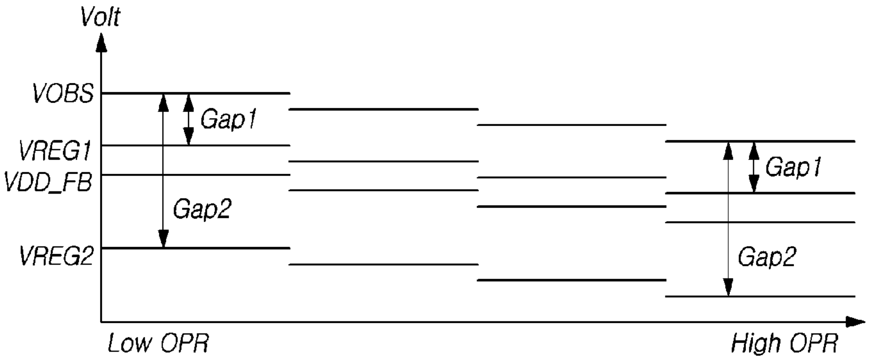
FIG. 13 illustrates a diagram of a case in which a deviation between a data voltage and a bias voltage is maintained constant even when an on-pixel ratio (OPR) is changed in the display device according to an embodiment of the present disclosure.

FIG. 13 illustrates a diagram of a case in which a deviation between a data voltage and a bias voltage is maintained constant even when an on-pixel ratio (OPR) is changed in the display device according to an embodiment of the present disclosure.

Referring to FIG. 13, a pattern of image data DATA displayed through the display panel 110 of the display device 100 according to an embodiment of the present disclosure may be changed over time when the image data DATA supplied to the display panel 110 is a moving image data.

Accordingly, as the pattern of the image data DATA is changed, the on-pixel ratio (OPR) of the subpixels SP emitted through the display panel 110 is changed for each frame, and a gray level of the display panel 110 in a frame period is changed with time.

For example, the pattern of the image data DATA displayed through the display panel 110 may be changed from a low on-pixel ratio (OPR) of a low gray level to a high on-pixel ratio (OPR) of a high gray level.

When the display panel 110 has an on-pixel ratio (OPR) of the low gray level close to black color during one frame, the high potential driving voltage VDD is supplied to a small number of subpixels SP. Accordingly, the voltage drop (IR drop) of the high potential driving voltage VDD transmitted through the display panel 110 is reduced.

On the other hand, when the display panel 110 has an on-pixel ratio (OPR) of a high gray level close to white color during one frame, the high potential driving voltage VDD is supplied to a large number of subpixels SP. Accordingly, the voltage drop (IR drop) of the high potential driving voltage VDD transmitted through the display panel 110 is increased.

As a result, since the degree of the voltage drop of the high potential driving voltage VDD supplied to the display panel 110 is changed as a change of the pattern of the image data DATA, a luminance deviation may occur between a refresh frame period and a skip frame period due to the gamma voltage generating circuit 170 for generating the reference gamma voltages VREG1, VREG2 using the feedback high potential driving voltage VDD_FB.

However, since the display device 100 of the present disclosure generates the bias voltage VOBS by using the feedback high potential driving voltage VDD_FB in the bias voltage generating circuit 180, it may generate the bias voltage VOBS having the same variation as the variation of the reference gamma voltages VREG1, VREG2 (see the gap Gap1 between VOBS and VREG1 and the gap Gap2 between VOBS and VREG2 as shown in FIG. 13).

As a result, the potential difference formed between the data voltage Vdata of the refresh frame period and the bias voltage VOBS of the skip frame period may be maintained at the same level, and the flicker between the refresh frame period and a skip frame period may be reduced.

Figure 14:
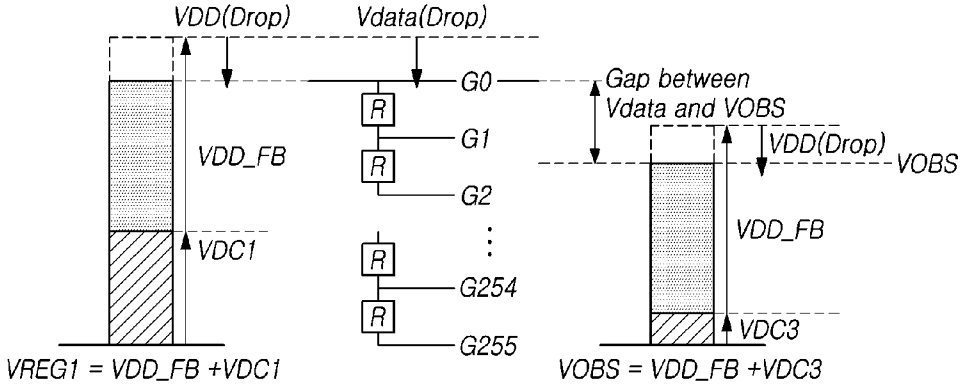
FIG. 14 illustrates a conceptual diagram of a phenomenon in which a reference gamma voltage has a same variation as a bias voltage according to a pattern change of image data in a display device according to an embodiment of the present disclosure.

FIG. 14 illustrates a conceptual diagram of a phenomenon in which a reference gamma voltage has a same variation as a bias voltage according to a pattern change of image data in a display device according to an embodiment of the present disclosure.

Referring to FIG. 14, the gamma voltage generating circuit 170 in the display device 100 according to an embodiment of the present disclosure may include a first reference gamma voltage output circuit 172 for generating a first reference gamma voltage VREG1 and a second reference gamma voltage output circuit 174 for generating a second reference gamma voltage VREG2. The first reference gamma voltage output circuit 172 and the second reference gamma voltage output circuit 174 may use the feedback high potential driving voltage VDD_FB as the reference voltage Vref respectively.

In this case, the on-pixel ratio (OPR) of the display panel 110 is changed according to the pattern change of the input image data DATA. As a result, a level of the feedback high potential driving voltage VDD_FB transmitted through the display panel 110 may be changed, and the first reference gamma voltage VREG1 generated from the first reference gamma voltage output circuit 172 and the second reference gamma voltage VREG2 generated from the second reference gamma voltage output circuit 174 may be changed.

However, since the bias voltage generating circuit 180 also generates the bias voltage VOBS by using the feedback high potential driving voltage VDD_FB as a reference voltage, the bias voltage VOBS has a variation same as the variation of the reference gamma voltages VREG1, VREG2.

As a result, even if the data voltage Vdata is changed according to the pattern of the image data DATA, that is, the level of the high potential driving voltage VDD, the bias voltage VOBS supplied to the display panel 110 in the skip frame period is also changed with the same variation according to the level of the high potential driving voltage VDD. Therefore, the deviation (or gap) between the data voltage Vdata in the refresh frame period and the bias voltage VOBS in the skip frame period is maintained at the same level (the data voltage Vdata and the bias voltage VOBS are changed with the same variation).

As described above, the display device 100 of the present disclosure may reduce the luminance deviation between the refresh frame period and the skip frame period and may improve a degradation of image quality due to flicker by associating the reference gamma voltages VREG1, VREG2 and the bias voltage VOBS with the high potential driving voltage VDD.

Figure 15:
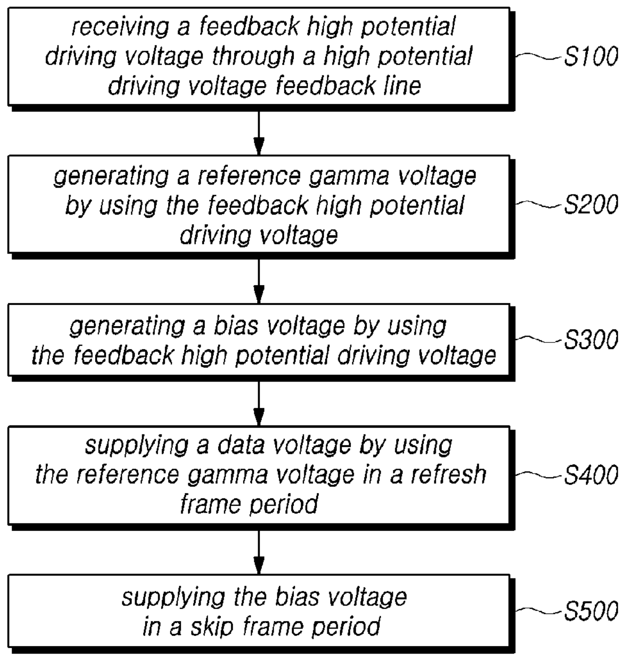
FIG. 15 illustrates a flowchart of a display driving method according to an embodiment of the present disclosure.

FIG. 15 illustrates a flowchart of a display driving method according to an embodiment of the present disclosure.

Referring to FIG. 15, a display driving method according to an embodiment of the present disclosure may include a step S100 of receiving a feedback high potential driving voltage VDD_FB through a high potential driving voltage feedback line VDD_FL, a step S200 of generating a reference gamma voltage VREG by using the feedback high potential driving voltage VDD_FB, a step S300 of generating a bias voltage VOBS by using the feedback high potential driving voltage VDD_FB, a step S400 of supplying a data voltage Vdata by using the reference gamma voltage VREG in a refresh frame period, and a step S500 of supplying the bias voltage VOBS in a skip frame period.

The step S100 of receiving a feedback high potential driving voltage VDD_FB through a high potential driving voltage feedback line VDD_FL is a process of receiving the feedback high potential driving voltage VDD_FB transmitted through the high potential driving voltage feedback line VDD_FL arranged on the display panel 110.

The step S200 of generating a reference gamma voltage VREG using the feedback high potential driving voltage VDD_FB is a process of generating a first reference gamma voltage VREG1 and a second reference gamma voltage VREG2 using the feedback high potential driving voltage VDD_FB in a gamma voltage generating circuit 170.

The first reference gamma voltage VREG1 and the second reference gamma voltage VREG2 are used to generate the data voltage Vdata through resistor strings.

The step S300 of generating a bias voltage VOBS using the feedback high potential driving voltage VDD_FB is a process of generating a bias voltage VOBS associated with a variation of the reference gamma voltage using the feedback high potential driving voltage VDD_FB in a bias voltage generating circuit 180.

The step S400 of supplying a data voltage Vdata using the reference gamma voltage VREG in a refresh frame period is a process of supplying the data voltage Vdata to the display panel 110 during the refresh frame period by the selection signal SEL of the timing controller 140.

The step S500 of supplying the bias voltage VOBS in a skip frame period is a process of supplying the bias voltage VOBS to the display panel 110 in the skip frame period by the selection signal SEL of the timing controller 140.

Through the above display driving method, the display device 100 of the present disclosure may reduce a luminance deviation between the refresh frame period and the skip frame period, and improve a degradation of image quality due to flicker by associating the reference gamma voltages VREG1, VREG2 and the bias voltage VOBS with the high potential driving voltage VDD.

Figure 16:
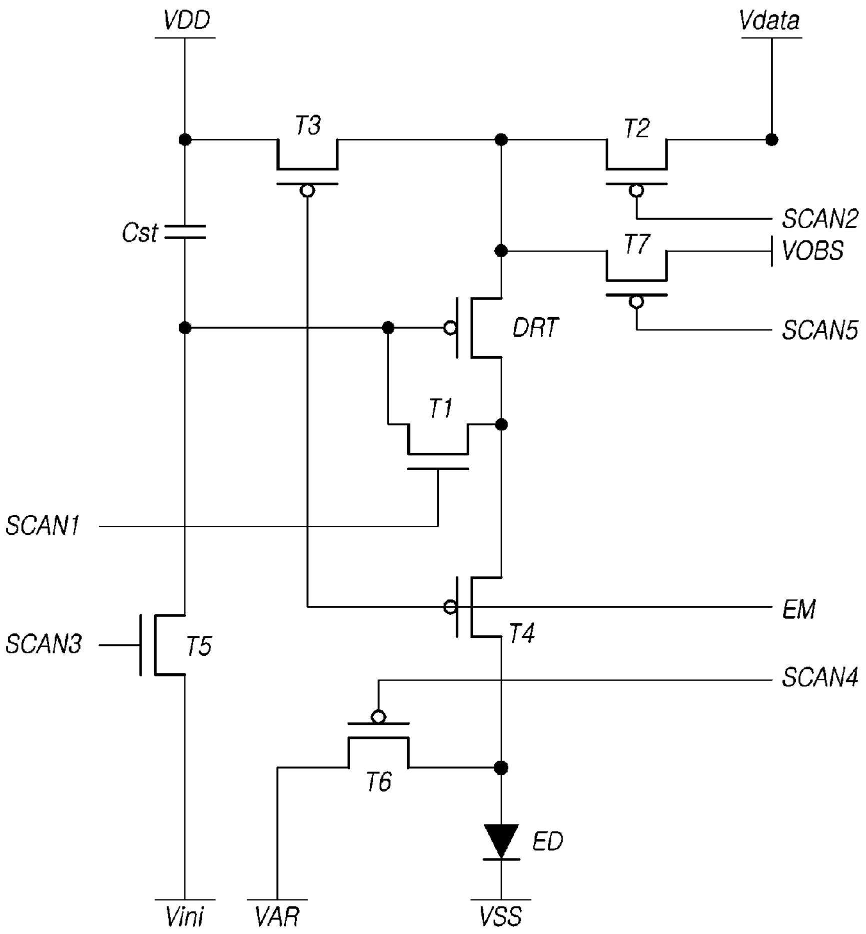
FIG. 16 illustrates a diagram of another subpixel circuit in a display device according to an embodiment of the present disclosure.

FIG. 16 illustrates a diagram of another subpixel circuit in a display device according to an embodiment of the present disclosure.

Referring to FIG. 16, a subpixel SP of the display device 100 according to an embodiment of the present disclosure includes first to seventh switching transistors T1-T7, a driving transistor DRT, a storage capacitor Cst and a light emitting element ED.

Here, the light emitting element ED may be, for example, a self-emissive element capable of emitting light by itself, such as an organic light emitting diode OLED.

In the subpixel SP according to an embodiment of the present disclosure, the second to fourth switching transistors T2-T4, the sixth switching transistor T6, the seventh switching transistor T7 and the driving transistor DRT may be P-type transistors. Also, the first switching transistor T1 and the fifth switching transistor T5 may be N-type transistors.

The P-type transistor is relatively more reliable than the N-type transistor. The P-type transistor has an advantage that the current flowing through the light emitting element ED is not shaken by the storage capacitor Cst since the drain electrode is fixed to the high potential driving voltage VDD. Therefore, the current tends to be supplied stably.

For example, the P-type transistor may be connected to the anode electrode of the light emitting element ED. At this time, a constant current can flow regardless of changes in the current and threshold voltage of the light emitting element ED when the transistors T4, T6 connected to the light emitting element ED operate in a saturation region. So, reliability is relatively high.

In this subpixel SP structure, the N-type transistors T1, T5 may be oxide transistors formed using a semiconducting oxide (for example, transistors with a channel formed from a semiconducting oxide such as indium, gallium, zinc oxide or IGZO), and other P-type transistors DRT, T2-T4, T6, T7 may be silicon transistors formed from semiconductors such as silicon (for example, transistors with a polysilicon channel formed by low temperature process like LTPS or low temperature polysilicon).

The oxide transistor has a relatively low leakage current compared to the silicon transistor. Therefore, when it is implemented using the oxide transistor, leakage current from the gate electrode of the driving transistor DRT is reduced, and there is an effect that can reduce the defect of image quality like flicker.

Meanwhile, the remaining P-type transistors DRT, T2-T4, T6, T7 except for the first switching transistor T1 and the fifth switching transistor T5 corresponding to the N-type transistor may be made of low temperature polysilicon.

A first scan signal SCAN1 is supplied to the gate electrode of the first switching transistor T1. A drain electrode of the first switching transistor T1 is connected to a gate electrode of the driving transistor DRT. A source electrode of the first switching transistor T1 is connected to a source electrode of the driving transistor DRT.

The first switching transistor T1 is turned on by the first scan signal SCAN1, and controls the operation of the driving transistor DRT using a high potential driving voltage VDD stored in the storage capacitor Cst.

The first switching transistor T1 may be formed of an N-type MOS transistor to constitute an oxide transistor. Since the N-type MOS transistor uses electrons as carriers, it has higher mobility and faster switching speed than the P-type MOS transistor.

A second scan signal SCAN2 is supplied to the gate electrode of the second switching transistor T2. Data voltage Vdata may be supplied to the drain electrode of the second switching transistor T2. A source electrode of the second switching transistor T2 is connected to a drain electrode of the driving transistor DRT.

The second switching transistor T2 is turned on by the second scan signal SCAN2 to supply the data voltage Vdata to the drain electrode of the driving transistor DRT.

A light emitting signal EM is supplied to the gate electrode of the third switching transistor T3. The high potential driving voltage VDD is supplied to a drain electrode of the third switching transistor T3. A source electrode of the third switching transistor T3 is connected to a drain electrode of the driving transistor DRT.

The third switching transistor T3 is turned on by the light emitting signal EM to supply the high potential driving voltage VDD to the drain electrode of the driving transistor DRT.

The light emitting signal EM is supplied to the gate electrode of the fourth switching transistor T4. A drain electrode of the fourth switching transistor T4 is connected to a source electrode of the driving transistor DRT. A source electrode of the fourth switching transistor T4 is connected to an anode electrode of the light emitting element ED.

The fourth switching transistor T4 is turned on by the light emitting signal EM to supply a driving current to the anode electrode of the light emitting element ED.

A third scan signal SCAN3 is supplied to a gate electrode of the fifth switching transistor T5.

Here, the third scan signal SCAN3 may be the first scan signal SCAN1 supplied to a subpixel SP at another position. For example, when the first scan signal SCAN1 is supplied to nth gate line, the third scan signal SCAN3 may be the first scan signal SCAN1 supplied to (n−9)th gate line. That is, the third scan signal SCAN3 may be used as the first scan signal SCAN1 at another gate line GL according to a driving phase of the display panel 110.

A stabilization voltage Vini is supplied to a drain electrode of the fifth switching transistor T5. A source electrode of the fifth switching transistor T5 is connected to a gate electrode of the driving transistor DRT and the storage capacitor Cst.

The fifth switching transistor T5 is turned on by the third scan signal SCAN3 to supply the stabilization voltage Vini to the gate electrode of the driving transistor DRT.

A fourth scan signal SCAN4 is supplied to a gate electrode of the sixth switching transistor T6.

A reset voltage VAR is supplied to the drain electrode of the sixth switching transistor T6. The source electrode of the sixth switching transistor T6 is connected to the anode electrode of the light emitting element ED.

The sixth switching transistor T6 is turned on by the fourth scan signal SCAN4 to supply the reset voltage VAR to the anode electrode of the light emitting element ED.

The fifth scan signal SCAN5 is supplied to the gate electrode of the seventh switching transistor T7.

The bias voltage VOBS is supplied to the drain electrode of the seventh switching transistor T7. The source electrode of the seventh switching transistor T7 is connected to the drain electrode of the driving transistor DRT.

Here, the fifth scan signal SCAN5 may be the fourth scan signal SCAN4 with different phase supplied to a subpixel SP at another position. For example, when the fourth scan signal SCAN4 is supplied to nth gate line, the fifth scan signal SCAN5 may be the fourth scan signal SCAN4 supplied to (n−1)th gate line. That is, the fifth scan signal SCAN5 may be used as the fourth scan signal SCAN4 at another gate line GL according to a driving phase of the display panel 110.

Meanwhile, since the fifth scan signal SCAN5 is a signal for supplying the bias voltage VOBS to the driving transistor DRT, it may be distinguished from the second scan signal SCAN2 for supplying the data voltage Vdata.

The gate electrode of the driving transistor DRT is connected to the drain electrode of the first switching transistor T1. The drain electrode of the driving transistor DRT is connected to the source electrode of the second switching transistor T2. The source electrode of the driving transistor DRT is connected to the source electrode of the first switching transistor T1.

The driving transistor DRT is turned on by the voltage difference between the source electrode and the drain electrode of the first switching transistor T1 to supply a driving current to the light emitting element ED.

A high potential driving voltage VDD is supplied to one side of the storage capacitor Cst and another side of the storage capacitor Cst is connected to the gate electrode of the driving transistor DRT. The storage capacitor Cst stores a voltage of the gate electrode of the driving transistor DRT.

The anode electrode of the light emitting element ED is connected to the source electrode of the fourth switching transistor T4 and the source electrode of the sixth switching transistor T6. A low potential driving voltage VSS is supplied to a cathode electrode of the light emitting element ED.

The light emitting element ED emits light with a predetermined luminance due to the driving current controlled by the driving transistor DRT.

At this time, the stabilization voltage Vini is supplied to stabilize the change of the capacitance formed in the gate electrode of the driving transistor DRT. The reset voltage VAR is supplied to reset the anode electrode of the light emitting element ED.

When the reset voltage VAR is supplied to the anode electrode of the light emitting element ED in a state that the fourth switching transistor T4 is turned off, the anode electrode of the light emitting element ED can be reset.

The sixth switching transistor T6 for supplying the reset voltage VAR is connected to the anode electrode of the light emitting element ED.

In order that the driving operation of the driving transistor DRT and the resetting operation of the anode electrode of the light emitting element ED are separately performed, the third scan signal SCAN3 for driving or stabilizing the driving transistor DRT and the fourth scan signal SCAN4 for controlling the supply of the reset voltage VAR to the anode electrode of the light emitting element ED are separated from each other.

When the switching transistors T5, T6 for supplying the stabilization voltage Vini and the reset voltage VAR are turned on, the fourth switching transistor T4 which connects the source electrode of the driving transistor DRT to the anode electrode of the light emitting element ED may be turned off. As a result, the driving current of the driving transistor DRT is blocked so as not to flow to the anode electrode of the light emitting element ED, so that the anode electrode is not affected by voltages other than the reset voltage VAR.

As described above, the subpixel SP including the eight transistors DRT, T1, T2, T3, T4, T5, T6, T7 and one capacitor Cst may be referred to as an 8T1C structure.

As previously described, the 8T1C structure is shown as an example among various type of subpixel SP circuits. The structure and number of transistors and capacitors constituting the subpixel SP may be variously changed. Meanwhile, each of the plurality of subpixels SP may have the same structure, or some of the plurality of subpixels SP may have different structures.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A display device comprising:

a display panel including a light emitting element, a driving transistor configured to provide a driving current to the light emitting element using a high potential driving voltage, and a plurality of switching transistors configured to control an operation of the driving transistor;

a gate driving circuit configured to supply a plurality of scan signals to the display panel;

a data driving circuit configured to generate a data voltage or a bias voltage using a feedback high potential driving voltage transmitted through a high potential driving voltage feedback line; and a timing controller configured to control the gate driving circuit and the data driving circuit with a first mode driven at a first driving frequency and a second mode driven at a second driving frequency, such that the data voltage is supplied to the display panel in a first period of the second mode and the bias voltage is supplied to the display panel in a second period of the second mode.

2. The display device according to claim 1, wherein the second driving frequency is less than the first driving frequency.

3. The display device according to claim 1, wherein the plurality of switching transistors include:

a first switching transistor to which a first scan signal is supplied to a gate electrode of the first switching transistor, a drain electrode of the first switching transistor is connected to a gate electrode of the driving transistor, and a source electrode of the first switching transistor is connected to a source electrode of the driving transistor;

a second switching transistor to which a second scan signal is supplied to a gate electrode of the second switching transistor, the data voltage is supplied to a drain electrode of the second switching transistor, and a source electrode of the second switching transistor is connected to a drain electrode of the driving transistor;

a third switching transistor to which a light emitting signal is supplied to a gate electrode of the third switching transistor, the high potential driving voltage is supplied to a drain electrode of the third switching transistor, and a source electrode of the third switching transistor is connected to the drain electrode of the driving transistor;

a fourth switching transistor to which the light emitting signal is supplied to a gate electrode of the fourth switching transistor, a drain electrode of the fourth switching transistor is connected to the source electrode of the driving transistor, and a source electrode of the fourth switching transistor is connected to an anode electrode of the light emitting element;

a fifth switching transistor to which a third scan signal is supplied to a gate electrode of the fifth switching transistor, a stabilization voltage is supplied to a drain electrode of the fifth switching transistor, and a source electrode of the fifth switching transistor is connected to the gate electrode of the driving transistor and a storage capacitor;

a sixth switching transistor to which a fourth scan signal is supplied to a gate electrode of the sixth switching transistor, a reset voltage is supplied to a drain electrode of the sixth switching transistor, and a source electrode of the sixth switching transistor is connected to the anode electrode of the light emitting element; and a seventh switching transistor to which a fifth scan signal is supplied to a gate electrode of the seventh switching transistor, the bias voltage is supplied to a drain electrode of the seventh switching transistor, and a source electrode of the seventh switching transistor is connected to the drain electrode of the driving transistor.

4. The display device according to claim 3, wherein the fifth scan signal is generated using the fourth scan signal.

5. The display device according to claim 3, wherein each of the first switching transistor and the fifth switching transistor include a respective oxide transistor, and each of the driving transistor, the second switching transistor, the third switching transistor, the fourth switching transistor, the sixth switching transistor, and the seventh switching transistor include a respective silicon transistor.

6. The display device according to claim 1, wherein the first period is a refresh frame period to which the data voltage driving the light emitting element is supplied.

7. The display device according to claim 1, wherein the second period is a skip frame period to which the bias voltage is supplied instead of the data voltage.

8. The display device according to claim 1, wherein the data voltage and the bias voltage are changed with a same variation.

9. A display driving method for driving a display panel including a light emitting element, a driving transistor configured to provide a driving current to the light emitting element using a high potential driving voltage, and a plurality of switching transistors configured to control an operation of the driving transistor, comprising:

receiving a feedback high potential driving voltage through a high potential driving voltage feedback line;

generating a reference gamma voltage using the feedback high potential driving voltage;

generating a bias voltage by using the feedback high potential driving voltage;

supplying a data voltage using the reference gamma voltage in a first mode driven at a first driving frequency;

supplying a data voltage using the reference gamma voltage in a first period of a second mode driven at a second driving frequency; and supplying the bias voltage in a second period of the second mode.

10. The display driving method according to claim 9, wherein the second driving frequency is less than the first driving frequency.

11. The display driving method according to claim 9, wherein the first period is a refresh frame period to which the data voltage driving the light emitting element is supplied.

12. The display driving method according to claim 9, wherein the second period is a skip frame period to which the bias voltage is supplied instead of the data voltage.

13. The display driving method according to claim 9, wherein the data voltage and the bias voltage are changed with a same variation.

* * * * *